United States Patent
Minar et al.

(10) Patent No.: US 12,531,141 B2
(45) Date of Patent: Jan. 20, 2026

(54) MODEL-INFORMED PRECISION DOSING SYSTEMS FOR TREATMENT OF INFLAMMATORY BOWEL DISEASE

(71) Applicant: Children's Hospital Medical Center, Cincinnati, OH (US)

(72) Inventors: Phillip Minar, Montgomery, OH (US); Alexander Vinks, Cincinnati, OH (US)

(73) Assignee: Children's Hospital Medical Center, Cincinnati, OH (US)

( * ) Notice: Subject to any disclaimer, the term of this patent is extended or adjusted under 35 U.S.C. 154(b) by 191 days.

(21) Appl. No.: 18/413,823

(22) Filed: Jan. 16, 2024

(65) Prior Publication Data
US 2024/0242807 A1    Jul. 18, 2024

Related U.S. Application Data

(60) Provisional application No. 63/439,452, filed on Jan. 17, 2023.

(51) Int. Cl.
    *G16H 20/10*      (2018.01)

(52) U.S. Cl.
    CPC .................................. *G16H 20/10* (2018.01)

(58) Field of Classification Search
    CPC ............................................... G06Q 50/20–26
See application file for complete search history.

(56) References Cited

U.S. PATENT DOCUMENTS

| | | | |
|---|---|---|---|
| 2022/0233527 A1* | 7/2022 | Machado De Lacerda | A61K 31/4985 |
| 2022/0259301 A1* | 8/2022 | Wallace | C07K 16/244 |
| 2022/0273651 A1* | 9/2022 | Pangan | A61K 31/495 |

OTHER PUBLICATIONS

Aardoom et al., "Vedolizumab Trough Levels in Children With Anti-Tumor Necrosis Factor Refractory Inflammatory Bowel Disease," JPGN, vol. 71, No. 4, Oct. 2020, pp. 501-507.

Aden et al., "Metabolic Functions of Gut Microbes Associate With Efficacy of Tumor Necrosis Factor Antagonists in Patients With Inflammatory Bowel Diseases," Gastroenterology, 2019;157:1279-1292.

Adolph, et al,. "Deciphering the vedolizumab dosing conundrum in IBD: when less is more" BMJ, Siegmund B. Gut Aug. 2022 vol. 71 No. 8, pp. 1455-1456.

Alper et al., "Correlation of Erythrocyte Sedimentation Rate and C-Reactive Protein With Pediatric Inflammatory Bowel Disease Activity" JPGN, vol. 65, No. 2, Aug. 2017, pp. e25-e27.

(Continued)

*Primary Examiner* — Neal Sereboff
(74) *Attorney, Agent, or Firm* — Frost Brown Todd LLP; Nicole M. Tepe

(57) ABSTRACT

Disclosed are methods for preparing a patient-specific vedolizumab dosing regimen for an individual in need thereof, comprising accessing, using a processor, a memory; selecting a first model stored in the memory; forecasting, based on the selected first model, a patient-specific predicted concentration time profile of the vedolizumab, selecting a dosing regimen, based on said forecasting, wherein said dosing regimen achieves a treatment objective, said treatment objective being a therapeutic level of vedolizumab; and outputting said dosing regimen. Further disclosed are methods of treating an individual having an inflammatory bowel disease.

20 Claims, 14 Drawing Sheets

(56) References Cited

OTHER PUBLICATIONS

Ananthakrishnan et al., "Gut microbiome function predicts response to anti-integrin biologic therapy in Inflammatory Bowel diseases," Cell Host Microbe. May 10, 2017; 21(5): 603-610.e3. doi:10.1016/j.chom.2017.04.010.

Baert, et al. "Influence of Immunogenicity on the Long-Term Efficacy of Infliximab in Crohn's Disease," N Engl J Med, 348;7, www.nejm.org, Feb. 13, 2003, pp. 601-608.

Bar-Yoseph, et al., "Infliximab-Tumor Necrosis Factor Complexes Elicit Formation of Anti-Drug Antibodies," Gastroenterology 2019;157:1338-1351.

Bauman, MD, et al., "Improved Population Pharmacokinetic Model for Predicting Optimized Infliximab Exposure in Pediatric Inflammatory Bowel Disease," Inflamm Bowel Dis, vol. 26, No. 3, Mar. 2020, pp. 429-439.

Becker, et al., "Residual homing of $\alpha 4\beta 7$-expressing $\beta 1+PI16+$ regulatory T cells with potent suppressive activity correlates with exposure-efficacy of vedolizumab," Gut 2022;71:1551-1566. doi:10.1136/gutjnl-2021-324868.

Beghini,et al. "Integrating taxonomic, functional, and strain-level profiling of diverse microbial communities with bioBakery 3." eLife 2021; 10:e65088. DOI: https://doi.org/10.7554/eLife.65088, pp. 1-42.

Brandse, MD, et al., "A Real-life Population Pharmacokinetic Study Reveals Factors Associated with Clearance and Immunogenicity of Infliximab in Inflammatory Bowel Disease," Inflamm Bowel Dis, vol. 23, No. 4, Apr. 2017, pp. 650-660.

Brooke "SUS—A quick and dirty usability scale" Smart Phone applications for people with Brain Injury, B5_During_the_trial_usability_scale_V1_09Aug11.pdf www.TBIStaffTraining.info, pp. 1-8.

W Byon, et al., "Establishing Best Practices and Guidance in Population Modeling: An Experience With an Internal Population Pharmacokinetic Analysis Guidance," Citation: CPT: Pharmacometrics & Systems Pharmacology (2013) 2, e51; doi:10.1038/psp.2013.26.

Cheifetz, Md, "A comprehensive literature review and expert consensus statement on therapeutic drug monitoring of biologics in inflammatory bowel disease," Am J Gastroenterol. Oct. 1, 2021; 116(10): 2014-2025. doi:10.14309/ajg.0000000000001396.

Chun, et al. " Analysis of Serum Vedolizumab Concentrations in Over 800 Patient Samples: Distribution of Drug and Anti-Drug Ab Levels and Serial Measurement Trends," The American Journal of Gastroenterology, 2018, S416 Abstracts, 739.

Church, et al. "Infliximab Maintains Durable Response and Facilitates Catch-up Growth in Luminal Pediatric Crohn's Disease" Inflamm Bowel Dis, vol. 20, No. 7, Jul. 2014, pp. 1177-1186.

Cohen, et al. "Management of Anti-drug Antibodies to Biologic Medications in Children With Inflammatory Bowel Disease," JPGN, vol. 69, No. 5, Nov. 2019, pp. 551-556.

Colman, MD, "Achieving Target Infliximab Drug Concentrations Improves Blood and Fecal Neutrophil Biomarkers in Crohn's Disease," Inflamm Bowel Dis, vol. 27, No. 7, Jul. 2021, pp. 1045-1051.

Colman, MD, "Favorable Outcomes and Anti-TNF Durability After Addition of an Immunomodulator for Anti-Drug Antibodies in Pediatric IBD Patients," Inflamm Bowel Dis, vol. 27, No. 4, Apr. 2021, pp. 507-515.

Colombel, et al. "Combination Therapy With Infliximab and Azathioprine Improves Infliximab Pharmacokinetic Features and Efficacy: A Post Hoc Analysis," Clinical Gastroenterology and Hepatology 2019;17:1525-1532.

Conrad, et al. "Vedolizumab Therapy in Severe Pediatric Inflammatory Bowel Disease," Inflamm Bowel Dis, vol. 22, No. 10, Oct. 2016, pp. 2425-2431.

Cosnes, et al. "Epidemiology and Natural History of Inflammatory Bowel Diseases," Gastroenterology 2011;140:1785-1794.

Costable, et al. "Prior Immunogenicity to Anti-TNF Biologics Is Not Associated with Increased Anti-drug Antibodies to Vedolizumab or Ustekinumab," Dig Dis Sci. Jun. 2022; 67(6): 2480-2484. doi:10.1007/s10620-021-07046-7.

Dreesen, "Evidence to Support Monitoring of Vedolizumab Trough Concentrations in Patients With Inflammatory Bowel Diseases," Clinical Gastroenterology and Hepatology 2018;16:1937-1946.

Dreesen, "Monitoring a Combination of Calprotectin and Infliximab Identifies Patients With Mucosal Healing of Crohn's Disease," Clinical Gastroenterology and Hepatology 2020;18:637-646.

Effenberger, "Microbial Butyrate Synthesis Indicates Therapeutic Efficacy of Azathioprine in IBD Patients," Journal of Crohn's and Colitis, 2021, 88-98, doi:10.1093/ecco-jcc/jjaa152.

Eser, et al. "Prediction of Individual Serum Infliximab Concentrations in Inflammatory Bowel Disease by a Bayesian Dashboard System," The Journal of Clinical Pharmacology 2018, 58(6) 790-802, 2018, The American College of Clinical Pharmacology, DOI: 10.1002/jcph.1069.

Eser, et al. "Increased Induction Infliximab Clearance Predicts Early Antidrug Antibody Detection," The Journal of Clinical Pharmacology 2021, 61(2) 224-233, 2020 The Authors. The Journal of Clinical Pharmacology published by Wiley Periodicals LLC on behalf of American College of Clinical Pharmacology DOI: 10.1002/jcph.1732.

"Guidance for Industry Population Pharmacokinetics" U.S. Department of Health and Human Services, Food and Drug Administration, Center for Drug Evaluation and Research (CDER) Center for Biologics Evaluation and Research (CBER), Feb. 1999 (31 pages).

Feagan, et al. "Treatment of Ulcerative Colitis with a Humanized Antibody to the a4B7 Integrin," N Engl J Med 352;24, www.nejm.org, Jun. 16, 2005, pp. 2499-2507.

Feagan, et al. "Vedolizumab as Induction and Maintenance Therapy for Ulcerative Colitis" N Engl J Med, 369;8, www.nejm.org, Aug. 22, 2013, pp. 699-710.

Franzosa, et al. "Relating the metatranscriptome and metagenome of the human gut," PNAS, Published online May 19, 2014, E2329-E2338, www.pnas.org/cgi/doi/10.1073/pnas.1319284111.

Gubatan, et al. "Vitamin D Is Associated with $\alpha 4\beta 7+$ Immunophenotypes and Predicts Vedolizumab Therapy Failure in Patients with Inflammatory Bowel Disease," Journal of Crohn's and Colitis, 2021, 1980-1990, https://doi.org/10.1093/ecco-jcc/jjab114, pp. 1980-1990.

Haiser, et al. "Predicting and manipulating cardiac drug inactivation by the human gut bacterium Eggerthella lenta+," Science. Jul. 19, 2013; 341(6143): 295-298. doi:10.1126/science.1235872, pp. 1-8.

Hanzel, et al. "Pharmacokinetic-Pharmacodynamic Model of Vedolizumab for Targeting Endoscopic Remission in Patients With Crohn Disease: Posthoc Analysis of the LOVE-CD Study," Crohn's & Colitis Foundation, Inflammatory Bowel Diseases, 2022, 28, 689-699, DOI: 10.1093/ibd/izab143, cover page and pp. 690-699.

Harris, et al. "Research Electronic Data Capture (REDCap)—A metadata-driven methodology and workflow process for providing translational research informatics support," J Biomed Inform. Apr. 2009; 42(2): 377-381. doi:10.1016/j.jbi.2008.08.010, pp. 1-10.

Hemperly et al. "Clinical Pharmacokinetics and Pharmacodynamics of Infliximab in the Treatment of Inflammatory Bowel Disease," Clin Pharmacokinet (2018) 57:929-942, https://doi.org/10.1007/s40262-017-0627-0, cover page and pp. 930-942.

Hoffmeyer, "The high-affinity FcγRI on PMN: regulation of expression and signal transduction," Blackwell Science Ltd, Immunology, 1997, 92, 544-552.

Hristodorov, et al. "Recombinant H22(scFv) blocks CD64 and prevents the capture of anti-TNF monoclonal antibody, A potential strategy to enhance anti-TNF therapy," mAbs 6:5, 1283-1289; Sep./Oct. 2014; © 2014 Taylor & Francis Group, LLC.

Hyams, et al. "Pharmacokinetics, Safety and Efficacy of Intravenous Vedolizumab in Paediatric Patients with Ulcerative Colitis or Crohn's Disease: Results from the Phase 2 HUBBLE Study," Journal of Crohn's and Colitis, 2022, 16, 1243-1254, https://doi.org/10.1093/ecco-jcc/jjac036.

Peter M. Irving & Krisztina B. Gecse, Optimizing Therapies Using Therapeutic Drug Monitoring: Current Strategies and Future Perspectives, Gastroenterology 2022;162:1512-1524.

(56) References Cited

OTHER PUBLICATIONS

Jongsma, et al. "Infliximab in young paediatric IBD patients: it is all about the dosing," *European Journal of Pediatrics* (2020) 179:1935-1944, https://doi.org/10.1007/s00431-020-03750-0.

Jossen, et al. "Anti-tumor Necrosis Factor-alpha Exposure Impacts Vedolizumab Mucosal Healing Rates in Pediatric Inflammatory Bowel Disease," *JPGN*, vol. 70, No. 3, Mar. 2020.

Kelly, et al. "Serum infliximab and corresponding anti-infliximab antibody: Analysis of over 30,000 patient results using lab developed chemiluminescent immunoassays," The American Journal of *Gastroenterology*, vol. 114, Supplement 1, Jul. 2019 www.amjgastro.com.

Lega et al. "Proactively Optimized Infliximab Monotherapy Is as Effective as Combination Therapy in IBD," *Inflamm Bowel Dis*, vol. 25, No. 1, Jan. 2019, pp. 134-141.

Levine, et al. "ESPGHAN Revised Porto Criteria for the Diagnosis of Inflammatory Bowel Disease in Children and Adolescents," *JPGN*, vol. 58, No. 6, Jun. 2014, pp. 795-806.

Lin, et al. "Meta-analysis: Fecal Calprotectin for Assessment of Inflammatory Bowel Disease Activity," *Inflamm Bowel Dis*, vol. 20, No. 8, Aug. 2014, www.ibdjournal.org, pp. 1407-1415.

Lloyd-Price, et al "Multi-omics of the gut microbial ecosystem in inflammatory bowel diseases," May 30, 2019, vol. 569, *Nature*, 655-662.

Louis et al "Association between polymorphism in IgG Fc receptor IIIa coding gene and biological response to infliximab in Crohn's disease," *Alimentary Pharmacology* (2004), vol. 19, pp. 511-519.

Lumley, "Regression subset selection, including exhaustive search," Jun. 10, 2024, 8 pages, 05:10:02 UTC.

Marini, et al. "Comparisons of Serum Infliximab and Antibodies-to-Infliximab Tests Used in Inflammatory Bowel Disease Clinical Trials of Remicade®," *The AAPS Journal*, vol. 19, No. 1, Jan. 2017 (2016), DOI: 10.1208/s12248-016-9981-3, pp. 161-171.

McLver, et al. "bioBakery: a meta'omic analysis environment," *Bioinformatics*, 34(7), 2018, 1235-1237, doi: 10.1093/bioinformatics/btx754.

McMurdie et al., "phyloseq: An R Package for Reproducible Interactive Analysis and Graphics of Microbiome Census Data," *PLOS One*, www.plosone.org, Apr. 2013, vol. 8, Issue 4, e61217, pp. 1-11.

Okamoto, et al. "Population pharmacokinetics of vedolizumab in Asian and non-Asian patients with ulcerative colitis and Crohn's disease," pISSN 1598-9100, eISSN 2288-1956, https://doi.org/10.5217/ir.2019.09167 , *Intest Res* 2021;19(1):95-105.

Ordas, et al. "Anti-TNF Monoclonal Antibodies in Inflammatory Bowel Disease: Pharmacokinetics-Based Dosing Paradigms," *Clinical pharmacology & Therapeutics*, vol. 91, No. 4, Apr. 2012, pp. 635-645.

Osterman, et al. "Vedolizumab exposure levels and clinical outcomes in ulcerative colitis: determining the potential for dose optimization," 2019 John Wiley & Sons Ltd, wileyonlinelibrary.com/journal/apt, *Aliment Pharmacol Ther.* 2019;49:408-418.

Venegas et al., "Short Chain Fatty Acids (SCFAs)-Mediated Gut Epithelial and Immune Regulation and Its Relevance for Inflammatory Bowel Diseases," *Frontiers in Immunology*, www.frontiersin.org, Mar. 2019, vol. 10, Article 277, pp. 1-16.

Pariente, et al. "Development of the Crohn's Disease Digestive Damage Score, the Le'mann Score," *Inflamm Bowel Dis*, vol. 17, No. 6, Jun. 2011, pp. 1415-1422.

Parikh et al., "Vedolizumab for the treatment of active ulcerative colitis: a randomized controlled Phase 2 dose-ranging study," *Inflamm Bowel Dis* 2012;18:1470-9.

Paul et al. "Therapeutic Drug Monitoring of Infliximab and Mucosal Healing in Inflammatory Bowel Disease: A Prospective Study," *Inflamm Bowel Dis*, vol. 19, No. 12, Nov. 2013, www.ibdjournal.org, pp. 2568-2576.

Powell Doherty, et al. "Extended Analysis Identifies Drug-Specific Association of 2 Distinct HLA Class II Haplotypes for Development of Immunogenicity to Adalimumab and Infliximab" *Gastroenterology* 2020;159:784-787.

R Core Team, "R: A Language and Environment for Statistical Computing," Version 4.5.0 (Apr. 11, 2025).

Robin, et al. "pROC: an open-source package for R and S+ to analyze and compare ROC curves," BMC Bioinformatics 2011, 12:77, http://www.biomedcentral.com/1471-2105/12/77, pp. 1-8.

Rosario, et al "Population pharmacokinetics-pharmacodynamics of vedolizumab in patients with ulcerative colitis and Crohn's disease," *Aliment Pharmacol Ther* 2015; 42:188-202.

Sandborn, et al. "Vedolizumab as Induction and Maintenance Therapy for Crohn's Disease" *N Engl J Med* 369;8, nejm.org, Aug. 22, 2013, pp. 711-721.

Sazonovs, et al "HLA-DQA1*05 Carriage Associated With Development of Anti-Drug Antibodies to Infliximab and Adalimumab in Patients With Crohn's Disease," *Gastroenterology* 2020;158:189-199.

Sherwin et al. "Fundamentals of Population Pharmacokinetic Modelling, Validation Methods," *Clin Pharmacokinet* 2012; 51 (9):573-590.

Sivan, et al. Commensal *Bifidobacterium* promotes antitumor immunity and facilitates anti-PD-L1 efficacy, *Science*. Nov. 27, 2015; 350(6264): 1084-1089.

Strik, et al. "Efficacy of dashboard driven dosing of infliximab in inflammatory bowel disease patients; a randomized controlled trial," *Scandinavian Journal of Gastroenterology*, 2021, vol. 56, No. 2, 145-154, https://doi.org/10.1080/00365521.2020.1856405.

Thiele, Package 'cutpointr', Determine and Evaluate Optimal Cutpoints in Binary Classification Tasks, Version 1.2.0, Dec. 10, 2024, pp. 1-74.

Ting, et al. "Cancer pharmacomicrobiomics: targeting microbiota to optimise cancer therapy outcomes," *Gut* 2022;71:1412-1425. doi:10.1136/gutjnl-2021-326264.

Turner et al., "Appraisal of the Pediatric Ulcerative Colitis Activity Index (PUCAI)" *Inflamm Bowel Dis*, vol. 15, No. 8, Aug. 2009, pp. 1218-1223.

Ungar et al., "The temporal evolution of antidrug antibodies in patients with inflammatory bowel disease treated with infliximab," *Gut* Sep. 16, 2013, pp. 57-58.

Ungar, et al. "Optimizing Anti-TNF-α Therapy: Serum Levels of Infliximab and Adalimumab Are Associated With Mucosal Healing in Patients With Inflammatory Bowel Diseases," *Clinical Gastroenterology and Hepatology* 2016;14:550-557.

Van den Berghe, et al. "Immunogenicity is not the driving force of treatment failure in vedolizumab-treated inflammatory bowel disease patients," *Journal of Gastroenterology and Hepatology* 34 (2019) 1175-1181.

Van Rheenen, et al. "The Medical Management of Paediatric Crohn's Disease: an ECCO-Espghan Guideline Update," *Journal of Crohn's and Colitis*, 2021, 171-194.

Vande Casteele et al. "Trough Concentrations of Infliximab Guide Dosing for Patients with Inflammatory Bowel Disease," *Gastroenterology* 2015;148:1320-1329.

Vande Casteele et al. "Real-world multicentre observational study including population pharmacokinetic modelling to evaluate the exposure-response relationship of vedolizumab in inflammatory bowel disease: ERELATE Study," *Aliment Pharmacol Ther.* 2022;56:463-476. wileyonlinelibrary.com/journal/apt.

Vermeire, et al., "Laboratory Markers in IBD: Useful, Magic, or Unnecessary Toys?," *Gut* 2006;55:426-431.

Vétizou et al., "Anticancer immunotherapy by CTLA-4 blockade relies on the gut microbiota," *Science*. Nov. 27, 2015; 350(6264): 1079-1084.

Williet et al. "Association Between Low Trough Levels of Vedolizumab During Induction Therapy for Inflammatory Bowel Diseases and Need for Additional Doses Within 6 Months," *Clinical Gastroenterology and Hepatology* 2017;15:1750-1757.

Wilson, et al. "HLADQA1*05 genotype predicts anti-drug antibody formation and loss of response during infliximab therapy for inflammatory bowel disease," 2019 John Wiley & Sons Ltd, wileyonlinelibrary.com/journal/apt, *Aliment Pharmacol Ther.* 2020;51:356-363.

Wyant, et al. "Comparison of the ELISA and ECL Assay for Vedolizumab Anti-drug Antibodies: Assessing the Impact on Pharmacokinetics and Safety Outcomes of the Phase 3 GEMINI Trials," *The AAPS Journal* (2021) 23: 3.

(56) References Cited

OTHER PUBLICATIONS

Wyant, et al. "Vedolizumab Immunogenicity With Long-Term or Interrupted Treatment of Patients With Inflammatory Bowel Disease," *The Journal of Clinical Pharmacology* 2021, 61(9) 1174-1181.

Zhou, et al., "LinDA: linear models for differential abundance analysis of microbiome compositional data," *Genome Biology* (2022) 23:95, pp. 2-23.

\* cited by examiner

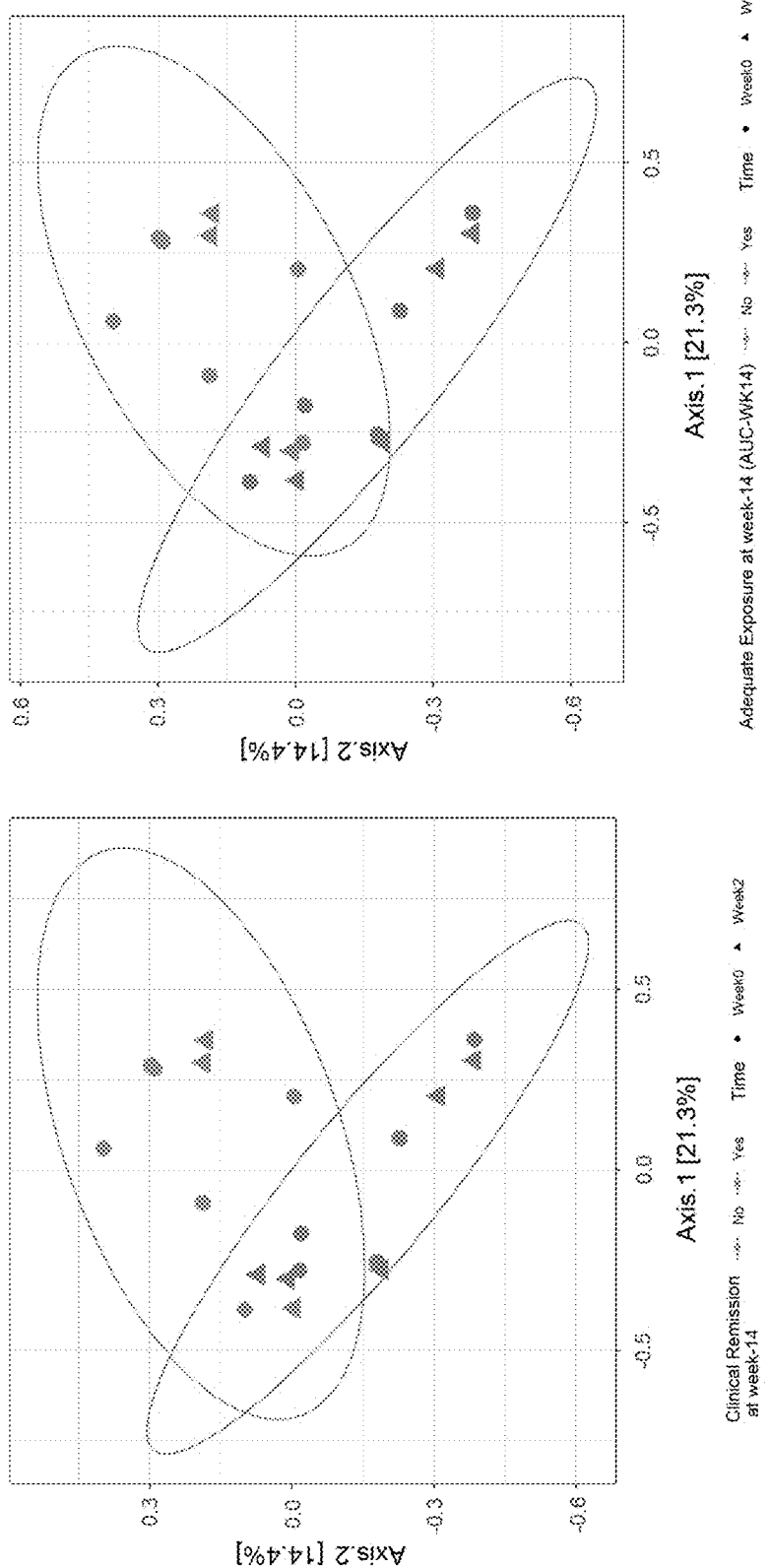

MODEL-INFORMED PRECISION DOSING SYSTEMS FOR TREATMENT OF INFLAMMATORY BOWEL DISEASE

CROSS-REFERENCE TO RELATED APPLICATIONS

This application claims priority to and benefit of U.S. Provisional Application Ser. No. 63/439,452, filed Jan. 17, 2023, the contents of which are incorporated in their entirety for all purposes.

STATEMENT REGARDING FEDERALLY-SPONSORED RESEARCH

This invention was made with government support under DK118314 awarded by the National Institutes of Health. The government has certain rights in the invention.

BACKGROUND

Anti-TNFα has become first-line therapy for children with moderate to severe Crohn's disease, but current dosing strategies are not optimized. It is known that biologics comprised of larger monoclonal antibodies, such as vedolizumab are associated with large inter-patient variability in drug clearance (CL). This is particularly true for the treatment of gut disorders associated with inflammation and increased gut permeability, such as inflammatory bowel disease (IBD). It is well established that there is high inter-patient variability in exposure and drug CL in IBD patients treated with biologics and such variability has been shown to be associated with an increased risk for primary non-response or secondary loss of response. These factors could lead to inadequate exposure to the drug by an accelerated drug CL if therapy is not personalized (adjusted) to account for these dynamic pharmacokinetic (PK) variations. There is a critical-need for methods that can provide a clinical decision support tool (CDST) to guide model-informed precision dosing (MIPD), in particular for anti-TNFα (infliximab) and anti-integrin (vedolizumab) based therapies in the pediatric patient. The instant disclosure seeks to address one or more of the aforementioned needs in the art.

BRIEF SUMMARY

Disclosed are methods for preparing a patient-specific infliximab and vedolizumab dosing regimen for an individual in need thereof, comprising accessing, using a processor, a memory; selecting a first model stored in the memory; forecasting, based on the selected first model, a patient-specific predicted concentration time profile of the vedolizumab, selecting a dosing regimen, based on said forecasting, wherein said dosing regimen achieves a treatment objective, said treatment objective being a therapeutic level of vedolizumab; and outputting said dosing regimen. Further disclosed are methods of treating an individual having IBD.

BRIEF DESCRIPTION OF THE DRAWINGS

Those of skill in the art will understand that the drawings, described below, are for illustrative purposes only. The drawings are not intended to limit the scope of the present teachings in any way.

(FIG. 1A) Observed individual concentrations versus model-predicted vedolizumab concentrations, (FIG. 1B) observed population concentrations versus model-predicted concentrations, (FIG. 1C) conditional weighted residuals versus population predictions and (FIG. 1D) conditional weighted residuals versus time.

FIG. 3A depicts boxplots of simulated vedolizumab trough concentrations (cTrough) in the maintenance phase with every 8-, 6-, 5- and 4-week intervals. The boxes represent the $25^{th}$, $50^{th}$ and $75^{th}$ percentiles of the simulations (n=1000). The dashed horizontal lines showed the targets (15 and 20 μg/ml). Ideal intervals based on median trough concentration targets stratified by weight are highlighted by a red border. FIG. 3B shows simulations of the combined effect of albumin and erythrocyte sedimentation rate on vedolizumab cTrough. Example illustrates a 4-week regimen for a 50 kg patient.

FIG. 6A-FIG. 6C. Beta-diversity of (FIG. 6A) steroid-free clinical remission at infusion-4 (FIG. 6B) induction exposure ($AUC_{week\ 14}$) and (6C) infusion-4 cTrough (<20 and >20 μg/ml).

(FIG. 9B) The patient's observed concentration-time curve and the measured infliximab concentration (8.9 μg/mL) at the third infusion after the consult. The shaded region in each panel represents the targeted trough concentration range (5-10 μg/mL) during infliximab maintenance.

DETAILED DESCRIPTION

Definitions

Figure 1B:
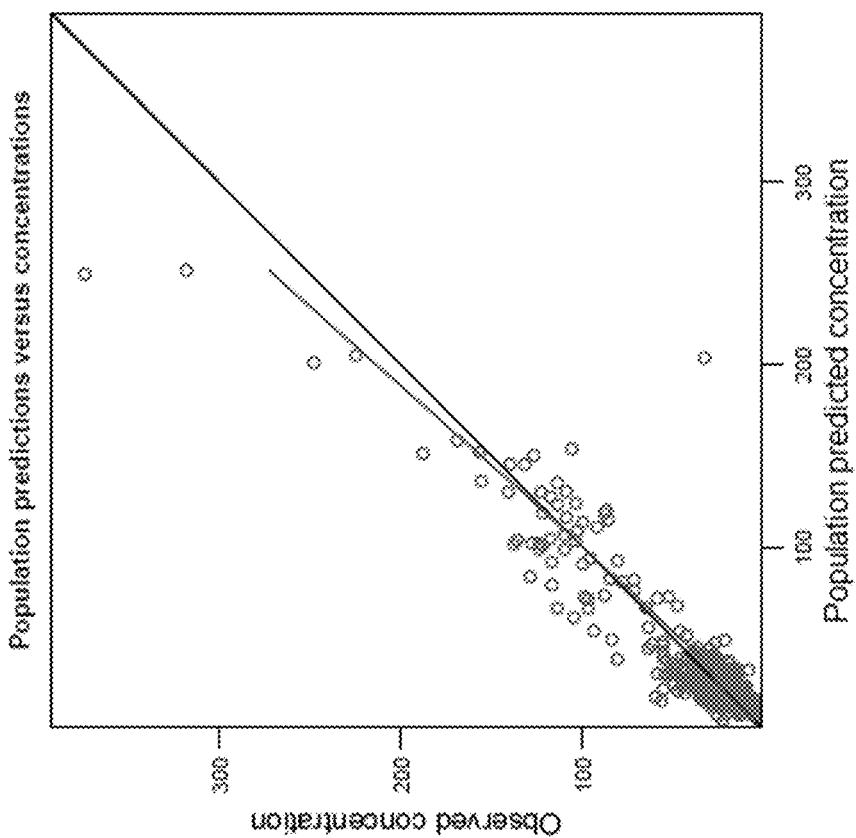
FIG. 1A-FIG. 1D. Goodness of fit plots of the final pediatric vedolizumab pharmacokinetics model.
Figure 1A:
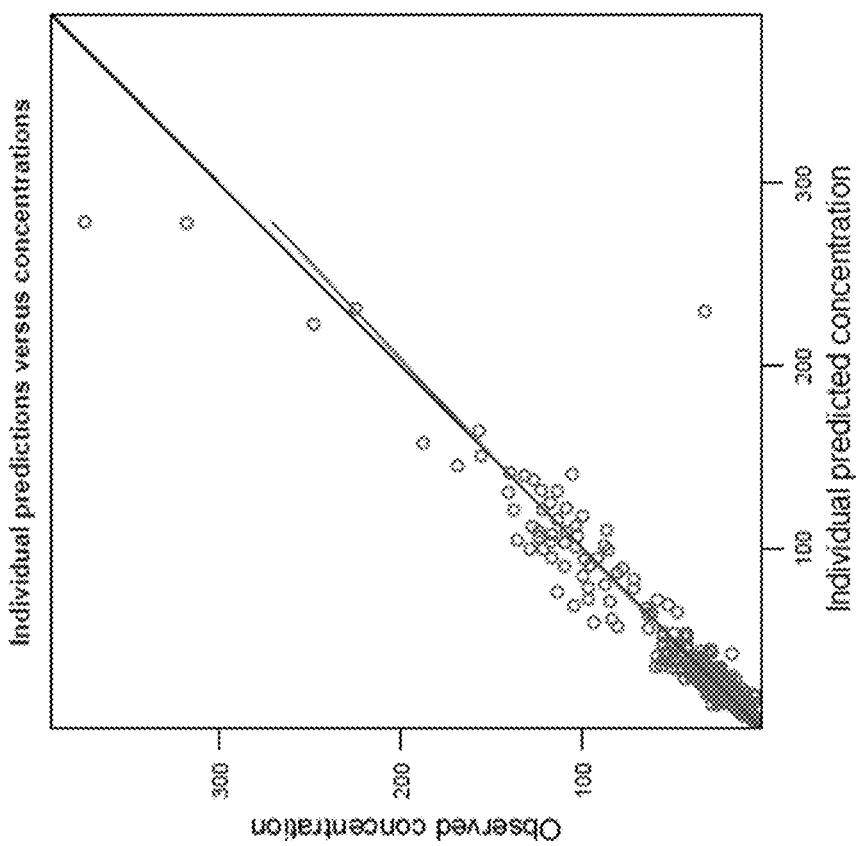
Figure 1C:
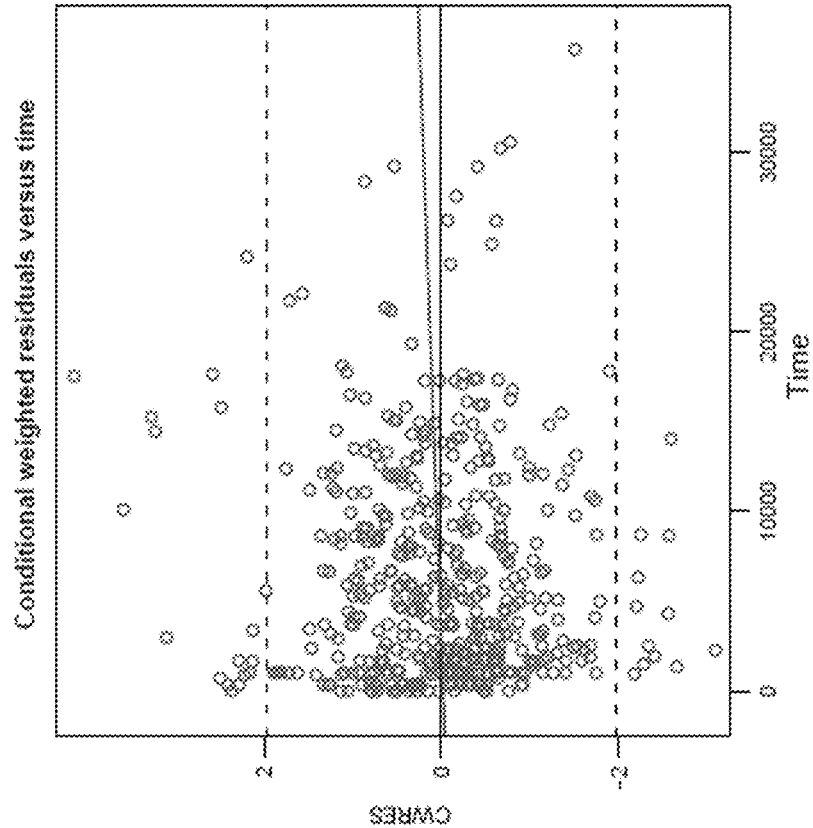
Figure 1D:
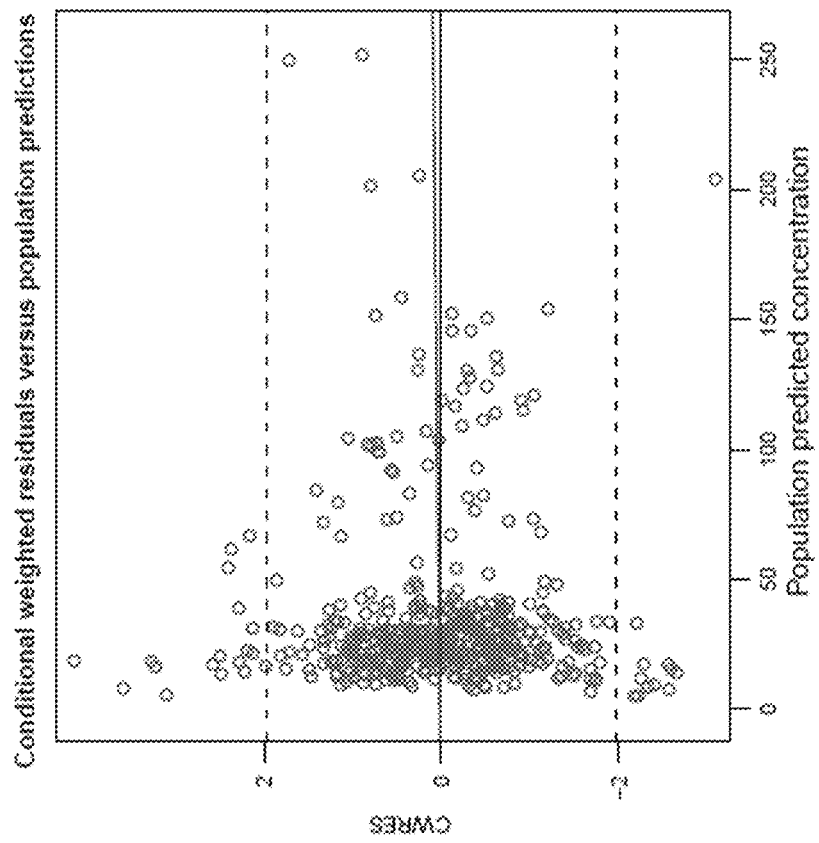

Unless otherwise noted, terms are to be understood according to conventional usage by those of ordinary skill in the relevant art. In case of conflict, the present document, including definitions, will control. Preferred methods and materials are described below, although methods and materials similar or equivalent to those described herein may be used in practice or testing of the present invention. All publications, patent applications, patents and other references mentioned herein are incorporated by reference in their entirety. The materials, methods, and examples disclosed herein are illustrative only and not intended to be limiting. The methods may comprise, consist of, or consist essentially of the elements of the compositions and/or methods as described herein, as well as any additional or optional element described herein or otherwise useful in systems or methods for treating inflammatory bowel disease, and/or providing a patient-specific infliximab or vedolizumab dosing regimen to an individual in need thereof.

As used herein and in the appended claims, the singular forms "a," "and," and "the" include plural referents unless the context clearly dictates otherwise. Thus, for example, reference to "a method" includes a plurality of such methods and reference to "a dose" includes reference to one or more doses and equivalents thereof known to those skilled in the art, and so forth.

The term "about" or "approximately" means within an acceptable error range for the particular value as determined by one of ordinary skill in the art, which will depend in part on how the value is measured or determined, e.g., the limitations of the measurement system. For example, "about" may mean within 1 or more than 1 standard deviation, per the practice in the art. Alternatively, "about" may mean a range of up to 20%, or up to 10%, or up to 5%, or up to 1% of a given value. Alternatively, particularly with respect to biological systems or processes, the term may mean within an order of magnitude, preferably within 5-fold, and more preferably within 2-fold, of a value. Where particular values are described in the application and claims, unless otherwise stated the term "about" meaning within an acceptable error range for the particular value should be assumed.

As used herein, the term "effective amount" means the amount of one or more active components that is sufficient to show a desired effect. This includes both therapeutic and prophylactic effects. When applied to an individual active ingredient, administered alone, the term refers to that ingredient alone. When applied to a combination, the term refers to combined amounts of the active ingredients that result in the therapeutic effect, whether administered in combination, serially or simultaneously.

The terms "individual," "host," "subject," and "patient" are used interchangeably to refer to an animal that is the object of treatment, observation and/or experiment. Generally, the term refers to a human patient, but the methods and compositions may be equally applicable to non-human subjects such as other mammals. In some embodiments, the terms refer to humans. In further embodiments, the terms may refer to children.

The pharmacokinetic (PK) variability of monoclonal antibody therapeutics such as vedolizumab and infliximab (anti-TNF) in children with inflammatory bowel disease (IBD) likely contributes to the inconsistent rates of clinical remission and endoscopic healing observed with standard (as-labeled) dosing. Although proactive or reactive therapeutic drug monitoring (TDM) will alert clinicians of vedolizumab or infliximab concentrations below target, early immunogenicity to infliximab is common in children and empiric ("trial and error") dose intensifications may delay the time to achieve the targeted concentration. Moreover, studies have consistently shown that higher infliximab exposure during induction is associated with superior rates of early remission. Given the limited therapeutic options for children and the high rates of immunogenicity to the anti-TNF biologics, Applicant identified a critical unmet need for a disease progression model, which can be implemented using a "PK dashboard" capable of bedside model-informed precision dose (MIPD) determination, to more rapidly (for example, during induction) and accurately attain targeted concentrations. Such model-informed precision dosing can further take into account an individual's unique characteristics that impact anti-TNF biologic clearance, such that, over time, a therapeutic level of drug can be attained with a greater degree of consistency.

Disclosed are systems and methods for predicting, proposing and/or evaluating a dosing regimen for a therapeutic, in particular a biologic, more particularly an antibody, more particularly an antibody having anti-TNF activity, for a specific individual in need thereof. For example, antibody-based therapies that may be used with the disclosed methods include, in particular, vedolizumab. Vedolizumab, sold under the brand name Entyvio, is a monoclonal antibody therapeutic developed by Millennium Pharmaceuticals, Inc. for the treatment of ulcerative colitis and Crohn's disease. It binds to integrin $\alpha_4\beta_7$, blocking the $\alpha_4\beta_7$ integrin results in gut-selective anti-inflammatory activity. The methods described herein may be used to optimize treatment of an individual having an inflammatory bowel disease as used herein using vedolizumab. The disclosed methods and systems are particularly useful for providing personalized dosing regimens in pediatric patients having an inflammatory bowel disease.

In one aspect, a mathematical model of an observed patient characteristic and/or response to vedolizumab is disclosed. The disclosed model may be refined over time, using data obtained from the individual to forecast an expected response. For example, the models may be used to predict when a level of vedolizumab will drop below a therapeutic level, indicating a need for a subsequent dose of vedolizumab. The disclosed mathematical model therefore may be useful for determining the time and/or amount of a first or subsequent dose, specific for a given individual. The disclosed methods and models may employ data obtained from an individual prior to a first dose, following a first (initial) dose, or following a second or further dose of vedolizumab, and may use such data to provide a specific dosing regimen that optimizes the level of vedolizumab for the most effective treatment outcome.

In one aspect, a method for preparing a patient-specific vedolizumab dosing regimen for an individual in need thereof is disclosed, the method comprising
  accessing, using a processor, a memory;
  selecting a first model stored in the memory;
  forecasting, based on the selected first model, a patient-specific predicted concentration time profile of the medication,
  selecting a dosing regimen, based on said forecasting, wherein said dosing regimen achieves a treatment objective, said treatment objective being a therapeutic level of a therapeutic agent; and
  outputting said dosing regimen.

Software for carrying out the disclosed methods and for use with the discloses systems may include computer-readable, processor-executable instructions stored in the memory for carrying out the methods. Further, the memory may store certain data, for example in databases or other data stores. Storage in the memory of the mathematical model data may be stored as a library module. Observed response data, administered dose information data, and updated models may further be stored in the memory. The method may further comprise receiving data indicative of a baseline (treatment-naïve) laboratory result for said patient. In further aspects, the method may comprise receiving data indicative of a response of the individual to an administered dose of vedolizumab, for example a first dose, a second dose, a third dose, or any dose following an initial dose. The dose may be a dose of an induction phase, for example, or of a maintenance phase.

The method may comprise providing at least one mathematical model to a system designed to apply and modify the model based on inputs (for example, covariate data) provided by the user. The mathematical model may be provided as part of a software module or library that is modular in nature, and that may be manipulated by a software program comprising microprocessor-executable instructions for specially configuring the system to carry out the method.

In one aspect, the method may further comprise inputting or providing patient-specific characteristics (data, which may be covariates) into a system capable of carrying out the disclosed methods. For example, such inputting or providing may be performed by a physician or other operator of the system by providing input via a keyboard, mouse, or touch screen, bar code/scanner, or other interface device of the system. The system may be specially configured with hardware and/or software comprising microprocessor-executable instructions for specially-configuring the system to carry out the disclosed methods.

In one aspect, the initial dosing regimen may be inputted, the disclosed methods useful for refining an individual's initial vedolizumab dosing regimen as a function of observed patient-specific data to generate a patient-specific predicted concentration time profile, which may further be used to predict the optimized dose and timing of a dose of vedolizumab. The patient-specific characteristics (covariate data) may be stored in the memory of the system, for example in the form of a database record. The inputted patient characteristics may be used in conjunction with one or more models to identify a dosing regimen specific to the individual, such dosing regimen being optimized to achieve a therapeutic level of vedolizumab in the individual, optimally in the shortest amount of time possible. The inputted patient characteristics can be used in conjunction with a disclosed model to identify a dosing regimen that is typical for covariates of the individual, i.e., a typical patient having the specific patient's covariate characteristics (e.g., for an individual of a particular weight) which is likely to provide a better dosing regimen than the default regimen, for example a regimen provided by the manufacturer. In a further aspect, the covariate data may be obtained at multiple time points, for example daily, every two days, twice a week, weekly, every two weeks, or monthly, and inputted into the system to obtain an updated dosing schedule for the individual based on the covariate data.

In one aspect, the methods may be used to predict response to vedolizumab based on certain covariate data. For example, such data may include one or more of an albumin level, a hemoglobin level, a platelet level, a C-reactive protein (CRP) level, a neutrophil CD64 (nCD64) level, a erythrocyte sedimentation rate (ESR), a fecal calprotectin level, a body surface area (BSA) level, a weight, and the presence of an antibody specific to said medication. In one aspect, the data indicative of a baseline or first response is an ESR level, an nCD64 level, an albumin level, and combinations thereof. Such data may be obtained at any time point before or during administration of the therapeutic agent.

In one aspect, the disclosed methods and systems may comprise receiving data from an individual, the data comprising the following covariates: body weight (WT), albumin level (ALB), ESR level, and nCD64 level. In this aspect, the model may comprise a determination of systemic clearance (CL) of vedolizumab based on the following equation:

$$CL = CL_{pop} \times (WT/70)^{0.606} \times (ALB/3.5)^{-1.44} \times (ESR/9)^{0.112}.$$

Such data may be obtained by a physician or other medical professional and may be inputted into the system, or, in other aspects, the received data may be obtained from an electronic health record and input into the system. In one aspect, the method may further comprise outputting a projected concentration-time profile(s) of vedolizumab based on the received data. Applying the equation above, the method may be used to predict and output a predicted trough concentration. The predicted trough concentration may then be used to determine the amount of and/or timing of a first or subsequent dose in the individual to obtain the desired Ctrough, which may then be used to provide a personalized dosing regimen.

In one aspect, the method may further comprise receiving data reflecting a response of the patient to the patient-specific vedolizumab dosing regimen. That is, a first dosing regimen (or first dose of a dosing regimen) may be administered, and the one or more covariates measured following the initial dose of vedolizumab may comprise the received data for purposes of carrying out the disclosed methods. The method may further include updating the first model based on the received data (e.g., the covariate data obtained before, during, or after a first dose). The method may further comprise calculating, based on the updated first model, at least one dosing regimen for the individual. The updated dosing regimen may then be outputted, and the updated dosing regimen may then be administered to the individual, such administering comprising providing the individual with the specific dose(s) at the specific time points identified by the applied model(s). The disclosed systems that employ the methods may further comprise an induction display and a maintenance display, e.g., to display the desired dosages and frequencies of dosages during an induction or maintenance phase, respectively. In one aspect, the method may be carried out during an induction phase. In one aspect, the method may be carried out during a maintenance phase.

As described above, the disclosed systems and methods may be of particular use for treatment of a pediatric individual, though in other aspects, the disclosed systems and methods may be used to provide an optimized and personalized dosing regimen to an adult individual. Pediatric individual, as used herein, includes an individual under the age or 18, or in other aspects, a pre-pubescent individual. In one aspect, the individual being treated, or for whom the personalized dosing regimen is provided, is diagnosed, or identified as likely to be diagnosed with an inflammatory bowel disease. For example, the inflammatory bowel disease may be one which is characterized by one or both of inflammation and increased gut permeability. In other aspects, the inflammatory bowel disease may be Crohn's disease, ulcerative colitis, and/or IBD unclassified.

The method may comprise determining a first dose of vedolizumab based on the predicted systemic clearance. In further aspects, the method may comprise determining a second or subsequent dose of vedolizumab based on the predicted systemic clearance. In a further action the method may comprise determining a dosing interval of vedolizumab based on the predicted systemic clearance.

In a further aspect, the method may comprise administering a first dose of vedolizumab to said individual prior to determining the predicted systemic clearance. In a further aspect, the method may comprise administering a second dose of vedolizumab prior to determining the predicted systemic clearance. The method may further comprise determining a dosing schedule based on the determined clearance and administering vedolizumab at an increased frequency as compared to an initial dosing schedule.

The method may further comprise determining a dosing schedule of vedolizumab based on the predicted systemic clearance and administering vedolizumab at a decreased frequency as compared to an initial dosing schedule.

In one aspect, the method may comprise comprising determining a predicted trough concentration of vedolizumab in said individual. In a further aspect, the method may comprise determining a predicted trough concentration of vedolizumab in said individual at a future time point, or at at least two future time points, or at least three future time points, or at least four future time points, or at more than four future time points.

In one aspect, the method the step of assessing the covariate may be carried out during an induction stage. In one aspect, the step of assessing the covariate may be carried out prior to an induction stage. In one aspect, the step of assessing the covariate may be carried out following an induction stage.

In one aspect, the individual being treated may be a pediatric individual, and may be, for example, vedolizumab naïve, or in other aspects, may have been previously treated with vedolizumab or other anti-TNF agent.

In certain aspects, the method may comprise the following: an individual having a higher than average body weight is administered one or both of an increased dose and a dose at an increased interval as compared to a recommended dose or interval. In other aspects, when the individual has a higher than average nCD64 level, the individual is administered one or both of an increased dose of vedolizumab and a dose of vedolizumab at an increased interval as compared to a recommended dose or interval. The body weight and/or said nCD64 level may be determined during an induction phase and/or prior to administering vedolizumab.

EXAMPLES

The following non-limiting examples are provided to further illustrate embodiments of the invention disclosed herein. It should be appreciated by those of skill in the art that the techniques disclosed in the examples that follow represent approaches that have been found to function well in the practice of the invention, and thus may be considered to constitute examples of modes for its practice. However, those of skill in the art should, in light of the present disclosure, appreciate that many changes may be made in the specific embodiments that are disclosed and still obtain a like or similar result without departing from the spirit and scope of the invention.

Example 1. Real-World Vedolizumab Pharmacokinetic Study in Children Identifies Two Novel Biomarkers of Drug Clearance Use of vedolizumab in pediatric inflammatory bowel disease (IBD) often requires an interval intensification from standard dosing due to distinct pharmacokinetics (PK) in children. Adult population PK models found inclusion of albumin, weight, anti-TNF naivety and antibodies-to-vedolizumab (ATV) as covariates of drug clearance (CL) improved model accuracy. Applicant aimed to build a population-PK model for children and identify novel covariates of drug CL to better account for pediatric-specific variability in vedolizumab PK.

Methods: This was a prospective multicenter cohort study for pediatric IBD patients starting vedolizumab. Vedolizumab dosing regimens were managed by the treating clinician. Stool, serum and plasma were collected at standardized intervals for robust PK sampling and biomarker analysis. Population PK analysis was conducted with non-linear mixed effects modeling (NONMEM 7.5). A 1-compartment model with proportional error model was created based on the PK data. In the final model, novel covariates were identified using a stepwise approach. A decrease in the objective function value (OFV)>3.84 was considered significant ($P<0.05$).

Results: Twenty-one patients had a total of 277 infusions with 274 measured vedolizumab peak and trough concentrations. Among these, 57% were male, 76% had Crohn's disease, and 81% had prior anti-TNF exposure. The median (IQR) age was 16 years (13-18) and median weight was 52 kg (41-71). Baseline biomarkers are described in Table 1.

TABLE 1

| Baseline Variables (n = 21) | |
|---|---|
| Baseline Variables | Median (IQR) |
| Albumin (g/dL) | 3.6 (3.2-4.0) |
| CRP (mg/dL) | 0.55 (0.4-2.5) |
| ESR (mm/hr) | 11 (6.8-20) |
| Neutrophil CD64 ratio | 5.5 (4.0-8.6) |
| White blood cell count ($10^9$/L) | 8.8 (7-10) |
| Hemoglobin (g/dL) | 13.5 (11.9-14.5) |
| Hematocrit (%) | 40.2 (36.8-42.4) |
| Platelets ($10^3$/μL) | 328 (290-377) |
| Fecal calprotectin (μg/g) | 478 (130-2526) |

Baseline CL was inversely correlated with albumin (R=−0.54, P=0.012), hemoglobin (R=−0.45, P=0.048), and platelets (R=−0.5, P=0.026). There was a positive correlation of CL with CRP (R=0.8, P<0.001), neutrophil CD64 (nCD64, R=0.68, P=0.001), fecal calprotectin (FCP. R=0.63, P=0.009), and BSA (R=0.59, P=0.007).

The final model estimated CL as 0.168 L/d (relative standard error (RSE), 13%) and volume (V) distribution as 3.97 L (8%). The interindividual variability (IIV) of the final model was 62.2% (25%) of CL and 37% (8%) of V. Covariates that significantly decreased the OFV were incorporated into the final model including weight for V and albumin, ESR, and nCD64 for CL. Prior anti-TNF, immunomodulators (n=3) or ATV (n=1) did not impact CL.

Baseline CL<0.161 L/d predicted an end of induction FCP remission (<250 µg/g) with an area under the curve (AUC) 0.7 (sensitivity 0.8, specificity 0.75) with the final model. A cut-off of 37 µg/mL at infusion-3 and 20 µg/mL at infusion-4 predicted end of induction clinical remission.

Conclusions: A novel pediatric PK model for vedolizumab using novel covariates including ESR and nCD64, may be used to guide model-informed precision dosing.

Example 2. Real World Population Pharmacokinetic Study in Children and Young Adults with Inflammatory Bowel Disease Discovers Novel Blood and Stool Microbial Predictors of Vedolizumab Clearance Summary: Vedolizumab for inflammatory bowel disease (IBD) is often intensified based on distinct pharmacokinetics in children. Prior adult-specific population pharmacokinetic models have identified limited covariates of drug clearance. Aims were to establish a population pharmacokinetic model for children and young adults to identify novel covariates of drug clearance to better account for pediatric-specific inter-patient variability in vedolizumab pharmacokinetics; a key secondary exploratory aim was to identify microbial signatures of pharmacokinetic outcomes in a subset of patients. The study included data from 463 observed vedolizumab concentrations (59 peaks and 404 troughs) from 74 patients with IBD (52 with Crohn's disease and 22 with ulcerative colitis or unclassified IBD, median age 16 years). Pharmacokinetic analysis was conducted with non-linear mixed effects modelling. For the evaluation of the exposure-response relationship, clinical outcomes were evaluated by trough levels, clearance and vedolizumab exposure. Whole-genome metagenomic sequencing was conducted at baseline and week 2. Results: A two-compartment population pharmacokinetic model was identified with a clear correlation between CL and weight, erythrocyte sedimentation rate, and hypoalbuminemia. Trough concentrations before infusion 3 (37 µg/ml) and before infusion 4 (20 µg/ml) best predicted steroid-free clinical remission at infusion 4. Using fecal metagenomics, an early (baseline and week 2) abundance of butyrate-producing species and pathways that were associated with an infusion 4 trough concentration >20 µg/ml were identified. Conclusions: This novel pediatric vedolizumab pharmacokinetic model may be used to inform precision dosing. An abundance of fecal butyrate producers is associated with early response to vedolizumab, suggesting that microbial analysis may be beneficial to biological selection.

Vedolizumab is a gut-specific biologic targeting the α4β7 integrin and approved for the treatment of inflammatory bowel disease (IBD) in adults. Prior clinical trials in adults provided the foundation of PK models that account for the inter-patient variability in drug CL with drug CL associated with albumin, extreme high body weight (>120 kg), antibodies-to-vedolizumab (ATV) and prior anti-TNF exposure.

Vedolizumab is largely used in children failing the anti-TNF biologics. Therefore, vedolizumab treatment in children is often started for patients with more severe or refractory inflammation. Prior pediatric studies found that there are unique PK needs to consider when starting vedolizumab. Notably, a significant difference between children and adults is that vedolizumab is dosed independently of weight among most adult patients, while children weighing <30 kg will require weight-dependent dosing (mg/kg).

While prior research has focused on conventional PK factors associated with patient variability, there has been great interest in exploring pharmacogenomic factors that may explain additional variability in the PK and/or that may serve as pharmacodynamic (PD) biomarkers of drug response. Interestingly, a prior study evaluated fecal microbial metagenomics among IBD patients treated with vedolizumab and found that there was an early higher abundance of butyrate-producing species and enrichment of microbial pathways associated with butyrate-synthesis among patients who achieved remission by week 14 (infusion-4) compared to patients who did not achieve remission. As butyrate is one of the short-chain fatty acids (SCFAs) known to fuel and strengthen the gut barrier function, it is possible that the response of the gut-selective vedolizumab in that study was actually mediated by variability in PK factors, such as differences in drug CL and subsequent subtherapeutic exposure. However, the prior study did not investigate associations of microbial markers with vedolizumab drug concentrations.

Applicant sought to generate a pediatric-specific population PK model for vedolizumab to identify patient-specific factors affecting drug CL as well as evaluating exposure-response relationships in children and young adults with IBD, and further, to explore whether specific microbial signatures, including previously identified butyrate producers, were associated with vedolizumab CL.

Materials and Methods

Study Design

A prospective observational study was conducted among children and young adult IBD patients receiving intravenous vedolizumab to develop a population PK model and to identify the PK factors specific to this population. The majority of patients received standard (as labelled) induction dosing (300 mg) at the routine 0, 2, and 6 weeks. Maintenance intervals, however, were between 4 and 8 weeks and at the discretion of the treating clinician. During the maintenance phase, dose optimizations were largely determined by the clinician's clinical assessment and guided by proactive therapeutic drug monitoring (TDM). Both induction and maintenance doses were between 6 and 10 mg/kg for patients less than 30 kg and 300 mg for patients above 30 kg, which is consistent with described pediatric cohorts. Serum samples were collected immediately prior to administration (trough) and between 30 min to 1 h after the end of the infusion (peak). Fecal samples were collected at five different intervals (pre-treatment, week 2 [infusion 2], week 14 [infusion 4], month 6 and year 1) to assess fecal calprotectin (FCP). Disease activity outcomes were collected at each infusion visit up to week 52. This study was part of the multicenter REFINE study, which aimed to investigate pediatric PK factors among different biological therapies.

Additionally, to ensure a robust number of vedolizumab concentrations and improve the sample size for population PK modelling, infusion and drug concentration data were collected retrospectively among patients treated with vedolizumab who were not enrolled in the prospective REFINE study and had the least one TDM performed in the first year of therapy.

Participants. The prospective REFINE study enrolled patients who were induced with intravenous vedolizumab. Patients were eligible for the prospective component if they were enrolled in REFINE, received a minimum of three vedolizumab infusions, had a confirmed diagnosis of IBD (Crohn's disease [CD], ulcerative colitis [UC] or IBD unclassified [IBD-U]) and were less than 22 years of age. As vedolizumab was positioned as the second biological for most pediatric patients, patients previously exposed to anti- TNF, other immunomodulators or other IBD medications were not excluded. Patients who had enteric infections within 2 weeks of vedolizumab induction were ineligible for study participation. All participants and/or parents/guardians involved in the prospective component provided assent and/or written consent prior to study enrolment. For the retrospective component of the study, IBD patients who received a minimum of three doses of intravenous vedolizumab were included. Patient data were included if they had complete infusion administration details (administration times, dose and duration) and had at least one vedolizumab trough concentration (cTrough) available and recorded in the electronic medical record (EMR). Patients who were previously enrolled in the prospective study were excluded from the retrospective component.

Measures and Outcomes

Pre-treatment patient demographics and disease characteristics, including, age, weight, race, sex, past medical and surgical history and medication exposure and disease severity (Paris classification), were recorded. Laboratory results prior to induction and throughout the vedolizumab treatment course were recorded with the Research Electronic Data Capture (REDCap) system. For patients enrolled in the prospective cohort, peripheral blood was obtained prior to every infusion as well as fecal specimens (prior to the infusion) according to the aforementioned schedule. Clinical disease activity scores included the weighted Paediatric CD Activity Index (wPCDAI) for CD and the Paediatric UC Activity Index (PUCAI) for UC and IBD-U patients at each infusion visit. For the retrospective component, the Physician Global Assessment (PGA) as previously defined by ImproveCareNow (ICN) Health Learning Network was abstracted from any clinic visit during the first year of vedolizumab treatment. The PGA scores disease activity in four categorical outcomes ranging from quiescent, mild, moderate and severe disease.

To be able to compare exposure-response relationships among the entire cohort, the wPCDAI and PUCAI outcomes for the prospective cohort and PGA from the retrospective cohort were compiled into one composite outcome, which was stratified into four disease activity categories (quiescent, mild, moderate and severe). For CD, categories consistent with published wPCDAI were used, including ≥12.5 for mild disease, >40 for moderate disease and >57.5 for severe disease. For UC/IBD-U, a PUCAI>10 defined mild activity, with ≥30 and >65 classified as moderate activity and severe activity respectively. Steroid-free clinical remission (SFCR) was defined as either a wPCDAI<12.5 or PUCAI<10 or quiescent PGA and off corticosteroids. FCP remission was defined as an FCP of <250 µg/g.

In addition to the formal population PK model development and evaluation as part of the PK modelling process, exposure-response relationships with respect to clinical response, cTrough and predictors of inadequate exposure during the induction phase were explored.

The secondary objective was to explore if early fecal microbial signatures are associated with variability in PK measures, i.e. whether microbial species and/or pathways at week 0 and/or week 2 were able to predict the end of induction cTrough, total induction exposure (defined as the area under the exposure curve, [AUC]) and vedolizumab drug CL.

Vedolizumab and Antibody Assay

Vedolizumab cTrough and peak serum concentrations for the prospective cohort and all TDM were analyzed using the electrochemiluminescence immunoassay (ECLIA, Lab-Corp-Esoterix). Lower limit of quantification (LLOQ) are 1.3 µg/ml for the vedolizumab assay and 25 ng/ml for the drug-tolerant ATV assay.

For the retrospective component, vedolizumab and ATV concentrations were measured with an ELISA assay (Miraca Life Sciences, InformTx). For this assay, the measurable vedolizumab concentration ranges from 2 to 60 µg/ml with the drug-tolerant ATV assay ranges from 35 to 500 ng/ml.

Additional Biomarker Assays

FCP was measured with an ELISA (Buhlmann, Switzerland). Neutrophil surface expression of Fcγ receptor I (CD64) for the IgG1 molecule, which is a biomarker for infliximab CL, was measured by quantitative flow cytometry (FACSCantos BD Biosciences).

Pharmacokinetic Analysis

Model Development and Evaluation

A population PK model has developed according to the FDA population PK Guidance for Industry and best practices guidance. Population PK modelling was performed using non-linear mixed effects modelling (NONMEM, version 7.5.0, ICON Development Solutions) with Perl-speaks-NONMEM (PsN version 5.2.6) and the Pirana interface (version 3.0.0, Certara). The first-order conditional estimation with interaction (FOCE-I) method was used for all parameter estimations. Both 1-compartment and 2-compartment models were evaluated. The chosen structural model was based on the previously published Rosario et al. model with data from the GEMINI trials. In short, this is a 2-compartment model with linear and nonlinear elimination, with a proportional error model. In the base model, CL and the volume of distribution of the central compartment (V1) were estimated, while the volume of distribution of the peripheral compartment (V2, 1.65 L) and intercompartmental CL (Q, 0.12 L/day) was fixed based on published parameter estimates as these parameters could not be estimated reasonably due to the limited PK sampling time points. Concentrations below the LLOQ in the data set were <10% and were omitted per published guidelines. Two occasions were established to estimate the inter-occasional variability, at induction (up to week 14) and at maintenance (>14 weeks).

In the modelling, both addition of time-constant covariates (sex, age at induction, diagnosis, baseline concomitant corticosteroids or immunomodulators and race) and time-varying covariates (including body weight, body surface area [BSA], body mass index [BMI], and routine laboratory markers such as albumin, ESR, c-reactive protein [CRP], neutrophil CD64 ratio [nCD64], FCP, hemoglobin and platelet count) were explored. Covariates were identified based on goodness-of-fit plots and tested versus the base model using a significance threshold with a difference in objective function value (dOFV). Covariates for the final model were selected with forward selection based on dOFV>6.63 ($p<0.01$) and backward elimination with an dOFV>10.83 ($p<0.001$). Finally, cumulative exposure (AUC) at each infusion (AUCx), and at the end-of-induction ($AUC_{week-14}$) were estimated with the trapezoidal rule and expressed in µg h/ml.

The final model was subsequently evaluated with goodness-of-fit plots, and prediction-corrected visual predictive check (pcVPC) plots with n=1000 simulations. Bootstrapping was performed with the replication of 1000 replicate data sets to estimate the median and obtain 95% confidence intervals (CI).

Additional simulation analyses (n=1000) were performed to study how various dosing intervals and the identified PK covariates in the population model would affect target attainment rates of previously published maintenance cTrough targets ≥15-20 μg/ml, which were reported to be associated with endoscopic remission.

Microbiome Sequencing and Analysis

Stool samples at week 0 and week 2 were collected from a subset of prospective patients that agreed to submit stool samples. After collection of stools, aliquots were preserved in an ethanol tube frozen at −80° C. until DNA extraction was performed using a published protocol as previously used in the integrative Human Microbiome Project. DNA extraction was completed with the Qiagen PowerFecal Pro extraction method by CCHMC Microbial Genomics and Metagenomics Laboratory (MGML). Sequencing was performed with the Illumina NovaSeq 6000 sequencer by Novogene. The average number of reads per sample was 21,014,622.

The Microbial Metagenomics Analysis Center (MMAC) then performed taxonomic and functional profiling on the demultiplexed fastq files using the biobakery workflow, using KneadData (version 0.10.0) for quality control followed by MetAPhlAn 3 (version 3.0.7) for taxonomic profiling and HUMAnN 3 (version 3.0.0) for functional profiling at the default settings.

Statistical Analysis of Exposure-Response Relationships

Following the development and evaluation of the final population PK model, statistical analysis and data visualization were conducted with R (R Core Team, Vienna, Austria 2020; version 4.0.2) to better understand the exposure-response relationship between vedolizumab cTrough, CL, AUCx and clinical outcomes. Continuous variables were reported as means with standard deviation (SD) or medians with the 25%-75% interquartile range (IQR) depending on the data distribution. The difference between disease activity severity and PK outcomes was tested with the Kruskal-Wallis test followed by the post hoc Dunn's test for multiple comparisons. The association of infusion-3 and infusion-4, cTrough and remission status were tested with non-parametric statistics for single comparisons (Wilcoxon rank sum test). To assess the best cut point for infusion-3 and infusion-4 cTrough associated with end-of-induction remission status (remission vs no-remission) receiver-operating characteristic (ROC) analyses with the Youden J method were performed to evaluate exposure with clinical or FCP remission selected as the outcomes ('Cutpointsr' and 'pROC' r packages). A similar analysis was conducted to obtain the cut point associated with adequate exposure ($AUC_{week-14}$) for the two endpoints. A scatter plot with Spearman correlation was created to evaluate the relationship between $AUC_{week\ 14}$ and weight-based dosing. To further evaluate risk factors associated with inadequate exposure univariate and multivariable logistic regression were conducted with the 'leaps' package.

Statistical Microbiome Analysis

Microbiome data from taxonomic species and functional pathways were converted to phyloseq objects with the 'phyloseq' package from R/Bioconductor. Quality control included filtering of taxa with a relative abundance of less than 1 e-5%. The Shannon Diversity Index, which considers the distribution of species within samples, was examined in relation to PK outcomes using linear regression with adjustment for dosing where necessary. Microbial diversity between samples (β-diversity) was evaluated by unsupervised principal coordinate analyses performed on the Bray-Curtis dissimilarity. Differential species and pathways were evaluated with linear models for differential abundance using the 'LinDA' package. Taxa and pathways with false discovery rate (FDR) corrected p<0.1 were considered differentially abundant.

Results

Demographics and Vedolizumab Concentration Distribution

The population PK model cohort included infusion data of 74 IBD patients, and included 70% (n=52) CD, and 49% (n=36) female patients. The cohort received a total of 964 vedolizumab infusions with 463 observed vedolizumab concentrations (59 peaks and 404 cTroughs). Baseline patient and disease characteristics are outlined in Table 2. The median peak concentration was 109 μg/ml (88-128), while the median cTrough was 25 μg/ml (17-32). Only one patient had incidental ATV measured at 363 ng/ml at infusion-2 which resolved (undetectable) without any intervention by infusion-3.

TABLE 2

Baseline Characteristics.

| Baseline characteristics | n = 74 |
|---|---|
| Sex, female, n (%) | 36 (49) |
| Race, white, n (%) | 63 (85) |
| Weight, kg (median, IQR) | 53 (45-70) |
| Diagnosis CD, UC, IBD-U, n (%) | 52 (70%), 21 (28), 1 (1) |
| Paris classification | |
| Crohn's location L1, L2 and L3, n (%) | 2 (4), 9 (17), 41 (79) |
| Upper location | 22 (42) |
| (L4, in addition to L1, L2 or L3) | |
| Crohn's behavior B1, B2 and B3, n (%) | 31 (60), 9 (17), 12 (23) |
| Ulcerative colitis/IBD-U E4, S0 | 10 (45), 19 (86) |
| Disease duration at induction, months (median, IQR) | 33 (16-80) |
| Age at vedolizumab induction, years (median, IQR) | 16 (13-18) |
| Immunomodulator use MTX, THIO, n (%) | 10 (14), 2 (3) |
| Corticosteroids use, n (%) | 25 (34) |
| Prior biological exposure, n (%) | |
| ≥1 anti-TNF agent | 70 (95) |
| IL-12/23 agent | 3 (4) |
| Prior surgery, n (%) | 20 (27) |
| Baseline (pre-treatment) biomarkers | |
| Albumin, median (IQR), g/dl (n = 65) | 3.5 (3.2-3.8) |
| C-reactive protein, median (IQR), mg/dl (n = 28) | 1.3 (0.5-2.7) |
| ESR, median (IQR), mm/h (n = 45) | 16 (8-25) |
| Neutrophil CD64, median (IQR), g/dl (n = 22) | 5.0 (3.9-7.1) |
| Fecal calprotectin (n = 20) | 476.7 (144-1563) |
| Starting dose | |
| 300 mg, n (%) | 66 (89) |
| Less than 300 mg, median (IQR), mg/kg (n = 8) | 6.0 (5.8-6.4) |
| Disease activity | |
| Prospective cohort (n = 21) | |
| wPCDAI (median, IQR) (n = 16) | 21 (10-46) |
| PUCAI, (median, IQR) (n = 5) | 10 (0-20) |
| Retrospective cohort (n = 53) | |
| PGA (quiescent, mild, moderate, severe), n (%) | 7 (13), 24 (45), 21 (40), 1 (2) |

Abbreviations: CD, Crohn's disease; ESR, erythrocyte sedimentation rate; IBD-U, IBD-unclassified; MTX, methotrexate; PGA, physician global assessment; PK, pharmacokinetic; PUCAI, pediatric UC activity index; THIO, thiopurine; UC, ulcerative colitis; wPCDAI, weighted pediatric CD activity index.

The majority of the cohort started maintenance therapy with only 7% (n=5) discontinuing before infusion-4. Sixtyeight percent (n=50) of patients completed 1 year of vedolizumab treatment. Although 91% (n=67) received the labelled induction dosing at weeks 0, 2 and 6, 77% (269/350) of maintenance infusions were administered at an interval of every 6 weeks or more frequently.

Prior to treatment, 43% (32/74) had mild disease activity and 38% (28/74) had moderate/severe disease activity, while the remaining 19% (14/74) had quiescent clinical disease based on the composite disease activity measure. Among patients who had disease activity assessments available at infusion-4, 74% (40/54) had the quiescent disease, with 89% (41/46) having the quiescent disease at week 52. In addition, there were no differences in disease activity when stratified by diagnosis (data not shown).

Model Development

Both 1- and 2-compartment PK models were evaluated. The (non-covariate) base model consisting of a 2-compartment model with estimated CL and V1 with fixed Q (0.12 L/d) and V2 (1.65 L) best described the data (Table 3). The inclusion of non-linear CL using estimated or fixed parameters described by Rosario et al. did not improve the model fit. Therefore, the non-linear CL was not included in the model. After covariate analyses, the final model included weight (kg), albumin (g/dl) and ESR (mm/h) as covariates on CL and weight on V1 (Table 3 and Table 4). The equations of the final model are described by:

$$CL(L/\text{day}) = CL_{pop} \times (WT/70)^{0.606} \times (ALB/3.5)^{-1.44} \times (ESR/9)^{0.112},$$

$$V1(L) = V1_{pop} \times (WT/70),$$

where $CL_{pop}$ is the typical population CL for a patient with a weight of 70 kg, albumin of 3.5 g/dl and ESR of 9 mm/h. $V1_{pop}$ is the typical V1 for the population with a weight of 70 kg. This demonstrates that the CL and V1 are associated with body weight and that CL is accelerated with low albumin and high ESR.

TABLE 3

Population parameter estimates of the base and final pharmacokinetics models.

| Parameter | Base model (OFV 2652.619) Estimate (RSE %) | Final model (OFV 2442.011) Estimate (RSE %) | Bootstrapped estimate (95% CI) |
|---|---|---|---|
| CL, L/d/70 kg | 0.165 (5.8) | 0.202 (3.1) | 0.203 (0.188-0.216) |
| Weight for CL | — | 0.606 (9.9) | 0.615 (0.456-0.756) |
| Albumin for CL | — | −1.44 (13.5) | −1.45 (−1.83 to −1.04) |
| ESR for CL | — | 0.112 (24.5) | 0.112 (0.054-0.170) |
| V1, L | 3.13 (10.2) | 4 (4.8) | 4.0 (3.6-4.4) |
| Q, L/d | 0.12 [FIXED] | 0.12 [FIXED] | — |
| V2, L | 1.65 [FIXED] | 1.65 [FIXED] | — |
| Interindividual variability-ω (CV %) | | | |
| $CL_L$ (CV %) | 0.125 (35.4%) | 0.0478 (21.9%) | 21.6% (17.5-25.5) |
| V1 (CV %) | 0.105 (32.4%) | 0.0181 (13.5%) | 12.7% (3.6-18.7) |
| Proportional error (CV %) | 0.0815 (28.5%) | 0.0614 (24.8%) | 0.061 (0.048-0.075) |

Abbreviations: CL, clearance; ESR, erythrocyte sedimentation rate; OFV, objective function value; Q, intercompartmental clearance; V1, volume distribution of central compartment; V2, volume distribution of peripheral compartment.

TABLE 4

Stepwise covariate modeling approach with stepwise forward selection and backward elimination to establish pediatric vedolizumab PK model.

| Covariates | OFV | Delta OFV | Significant? | IIV for CL | CV % for CL | Delta CV % | % of base model | Phase of Model |
|---|---|---|---|---|---|---|---|---|
| 1. Single covariate inclusion:* | | | | | | | | Phase 1 |
| No covariate model | 2652.619 | | | 0.125 | 35.4 | | | Base Model |
| BASE + BW (body weight on CL and V1) | 2613.106 | −39.513 | Yes | 0.0845 | 29.1 | −6.3 | 17.8 | |
| BASE + ALB | 2525.783 | −126.836 | Yes | 0.0927 | 30.4 | −4.9 | 13.9 | |
| BASE + ESR | 2573.053 | −79.566 | Yes | 0.104 | 32.2 | −3.1 | 8.8 | |
| BASE + BSA | 2642.803 | −9.816 | Yes | 0.091 | 30.2 | −5.2 | 14.7 | |
| BASE + nCD64 (categorical) | 2642.718 | −9.901 | Yes | 0.122 | 34.9 | −0.4 | 1.2 | |
| BASE + nCD64 (continuous) | 2645.298 | −7.321 | Yes | 0.116 | 34.1 | −1.3 | 3.7 | |
| 2. Forward stepwise selection:** | | | | | | | | Phase 2 |
| +BW + ALB | 2464.188 | −148.918 | Yes | 0.0927 | 30.4 | −5.0 | 100.0 | |
| +BW + ALB + ESR | 2442.011 | −22.177 | Yes | 0.0478 | 21.9 | −8.5 | 38.6 | Final Model |

TABLE 4-continued

Stepwise covariate modeling approach with stepwise forward selection and backward elimination to establish pediatric vedolizumab PK model.

| Covariates | OFV | Delta OFV | Significant? | IIV for CL | CV % for CL | Delta CV % | % of base model | Phase of Model |
|---|---|---|---|---|---|---|---|---|
| +BW + ALB + ESR + nCD64 (categorical) | 2443.461 | 1.45 | No | 0.0455 | 21.3 | −14.0 | 39.7 | |
| +BW + ALB + ESR + nCD64 (continuous) | 2440.304 | −1.707 | No | 0.0412 | 20.3 | −15.1 | 42.6 | |
| 3. Backward stepwise elimination:*** | | | | | | | | Phase 3 |
| +BW + ALB + ESR | 2442.011 | | | | | | | Final Model |
| +BW + ESR (−ALB) | 2534.117 | 87.219 | No | | | | | |
| +ALB + ESR (−BW) | 2509.529 | 67.518 | No | | | | | |
| +BW + ALB (−ESR) | 2464.188 | 22.177 | No | | | | | |

Abbreviations: OFV, objective function value.
*OFV reduction >3.84 (P < 0.05).
**OFV reduction >6.63 (P < 0.01).
***OFV reduction >10.83 (P < 0.001). CL, clearance. V1, volume distribution of central compartment. BW, weight (on CL and V1). ALB, Albumin. ESR, erythrocyte sedimentation rate. BSA, body surface area. nCD64, neutrophil CD64.

The addition of the three covariates in the final model led to an absolute reduction in unexplained interindividual variability in CL of 13.5% (35.5% in the base model to 21.9% in the final model). In addition, including all covariates reduced the unexplained variability in V1 by 18.4%. To account for a potential difference in PK parameters between the induction and maintenance phase, inter-occasional variability was assessed between induction and maintenance, however, this did not further improve the final model. The final unexplained random residual variability, estimated as the proportional residual error was 24.5% (CV %), which is comparable to the residual error in a previously published adult PK model. To account for the unexplained variability, an additive residual error model was explored. However, including the additive error model did not improve the model fit.

The PK differences between CD and IBD-U diagnoses were examined. Although both CD and UC/IBD-U were combined in the population PK analysis, no appreciable differences in drug CL between CD and UC/IBD-U were found during model development or after the final model was constructed (data not shown). While no differences in drug CL were found, UC/IBD-U patients had higher median infusion-4 levels compared to CD patients, 23 μg/ml (18-29) vs 17 μg/ml (9.9-23; p=0.046) respectively (Table 5). CD patients received a higher weight-based dose during induction compared to UC/IBD-U patients (Table 5) with no difference in the dosing intervals.

TABLE 5

Comparison of induction trough concentrations, dose and dosing frequency by IBD diagnosis.

| | CD (n = 52) | UC/IBD-U (n = 22) | P-value |
|---|---|---|---|
| Trough level, μg/mL, (median, IQR) | Inf2: 29 (28-40) | Inf2: 40 (37.8-52) | 0.21 |
| | Inf3: 26.5 (21.8-38.5) | Inf3: 28 (18-39) | 0.78 |
| | Inf4: 17 (9.9-23) | Inf4: 23 (18-29) | 0.046 |
| Weight-based dose, mg/kg, (median, IQR) | Inf1: 5.7 (4.7-6.6) | Inf1: 4.9 (4.2-5.8) | 0.03 |
| | Inf2: 5.7 (4.6-6.5) | Inf2: 4.9 (4.2-5.7) | 0.01 |
| | Inf3: 5.6 (4.6-6.6) | Inf3: 4.9 (4.1-5.4) | 0.01 |
| | Inf4: 5.5 (4.1-6.6) | Inf4: 4.8 (4.0-5.2) | 0.03 |

TABLE 5-continued

Comparison of induction trough concentrations, dose and dosing frequency by IBD diagnosis.

| | CD (n = 52) | UC/IBD-U (n = 22) | P-value |
|---|---|---|---|
| Week from induction, (median, IQR) | Inf2: 2 (2-2) | Inf2: 2 (2-2) | 0.31 |
| | Inf3: 6 (6-6) | Inf3: 6 (6-6) | 0.26 |
| | Inf4: 11 (10-14) | Inf4: 10 (10-14) | 0.37 |

Abbreviations: CD, Crohn's disease; UC, ulcerative colitis; IBD-U, IBD-unclassified; Inf, infusion.

Model Evaluation

Figure 2:
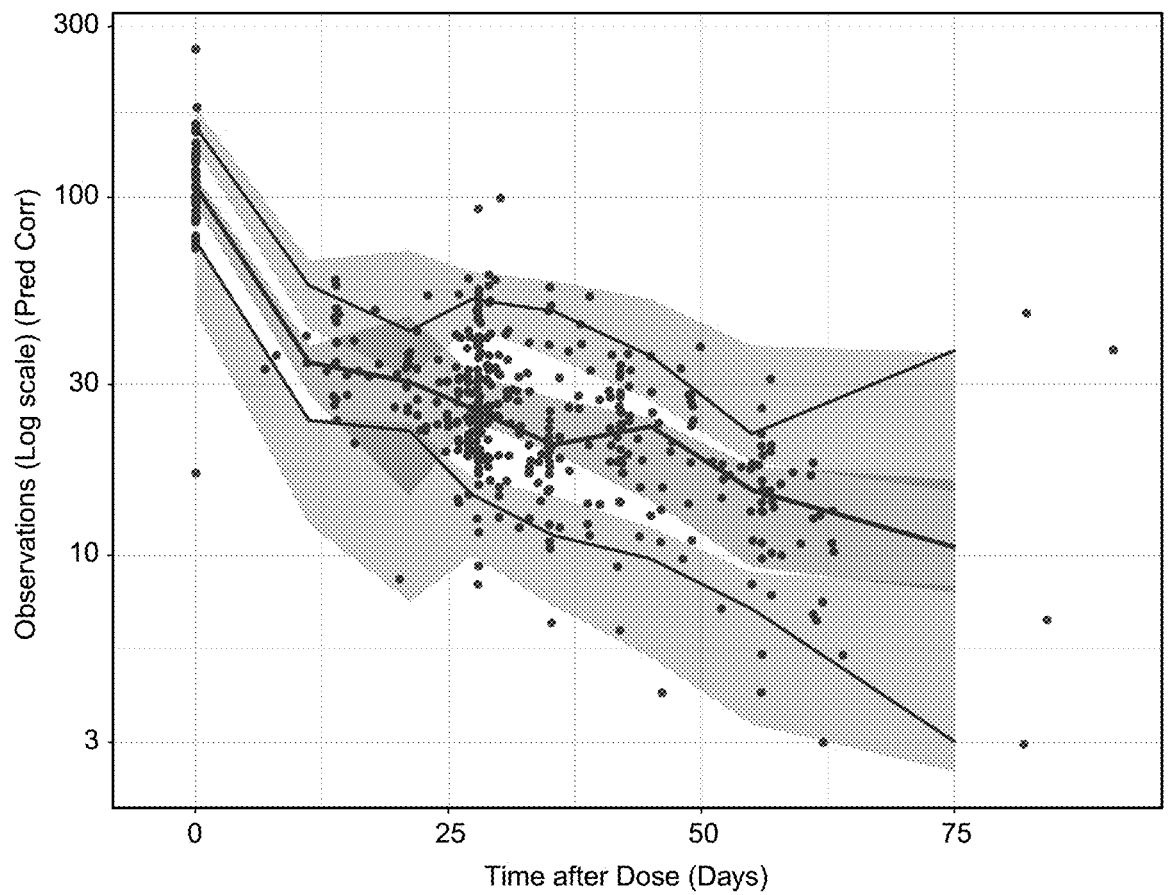
FIG. 2. Prediction-corrected visual predictive check of the final paediatric vedolizumab pharmacokinetics model. The black dots illustrate the observed vedolizumab concentrations. The middle line illustrates the observed median prediction-corrected vedolizumab concentrations over time (time after dose in days). The two outer lines illustrate the fifth and 95th percentiles of the prediction-corrected observations over time. The shaded areas represent the 95% confidence interval for the median (middle) and fifth and 95 percentiles (outer shaded areas) for simulated concentrations (n=1000).

The goodness-of-fit plots in FIGS. 1A-1D show that the final model appropriately describes the observations. To further evaluate how adequately the model predicted the vedolizumab concentrations over time after each dose, a pcVPC was performed; it was found that the majority of the observed concentrations were within the 95% CI of the predicted concentration ranges (FIG. 2).

Simulations

Simulations (n=1000) with the final model were performed to investigate the influence of the different maintenance intervals and PK covariate predictors on steady-state maintenance (weeks 21-24) target attainment rates, with a preselected target of 15 or 20 μg/mL. Two types of simulations were conducted. The first simulation analysis investigated different maintenance intervals at every 8, 6, 5 or 4 weeks, for weights between 10 and 80 kg and normal inflammatory markers (Alb 3.5 g/dl and ESR 9 mm/h). This analysis identified that with standard dosing of 300 mg (or 10 mg/kg for <30 kg) every 8 weeks for any given patient weight, the target attainment rate was less than 50% for a target of >15 μg/ml or <20% for a target concentration of >20 μg/ml (Table 6). However, if the interval was shortened to every 4 weeks, the target attainment rate was increased to between 85% and 100% for a target attainment rate of either >15 or >20 μg/ml. In comparison to the flat (300 mg) dosing, the weight-based dosing with interval shortening (not dose escalation) had a superior target attainment rate (FIG. 3A; Table 6). Furthermore, dose modification above 300 mg for a >30 kg was not indicated to improve target attainment if the interval was shortened (FIG. 3A; Table 6).

TABLE 6

[S2]. Simulation of median predicted trough concentrations and target attainment rates (for 15 μg/mL and 20 μg/mL) at week 21-24 for different maintenance dosing intervals.

| | Body weight (kg) | | | | | | | |
|---|---|---|---|---|---|---|---|---|
| | 10 | 20 | 30 | 40 | 50 | 60 | 70 | 80 |
| 8-weeks regimen | | | | | | | | |
| Median prediction at week 22, μg/mL | 12.5 | 13.7 | 14.9 | 12.2 | 10.6 | 9.6 | 8.8 | 8.3 |
| Target (15 μg/mL) attainment rate, % | 23.3 | 37.0 | 48.8 | 23.9 | 13.4 | 8.6 | 4.7 | 2.7 |
| Target (20 μg/mL) attainment rate, % | 2.6 | 8.5 | 16.2 | 4.9 | 1.8 | 0.8 | 0.3 | 0.3 |
| 6-weeks regimen | | | | | | | | |
| Median prediction at week 24, μg/mL | 18.6 | 21.5 | 23.1 | 19.1 | 16.7 | 15.2 | 14.1 | 13.3 |
| Target (15 μg/mL) attainment rate, % | 82.6 | 92.7 | 94.0 | 79.9 | 66.5 | 51.7 | 42.6 | 35.9 |
| Target (20 μg/mL) attainment rate, % | 36.4 | 60.8 | 71.0 | 44.5 | 30.4 | 19.1 | 12.4 | 8.1 |
| 5-weeks regimen | | | | | | | | |
| Median prediction at week 21, μg/mL | 23.4 | 27.6 | 31.2 | 26.1 | 22.9 | 20.8 | 19.4 | 18.2 |
| Target (15 μg/mL) attainment rate, % | 97.6 | 99.0 | 99.5 | 98.0 | 94.0 | 87.9 | 81.4 | 75.2 |
| Target (20 μg/mL) attainment rate, % | 76.1 | 90.7 | 95.7 | 83.4 | 70.7 | 55.9 | 46.7 | 36.8 |
| 4-weeks regimen | | | | | | | | |
| Median prediction at week 22, μg/mL | 30.9 | 37.6 | 43.3 | 36.5 | 32.4 | 29.5 | 27.4 | 25.8 |
| Target (15 μg/mL) attainment rate, % | 100 | 100 | 100 | 100 | 99.5 | 98.7 | 98.4 | 98.0 |
| Target (20 μg/mL) attainment rate, % | 98.2 | 99.6 | 99.6 | 98.5 | 96.5 | 93.2 | 88.6 | 84.7 |

Figure 3B:
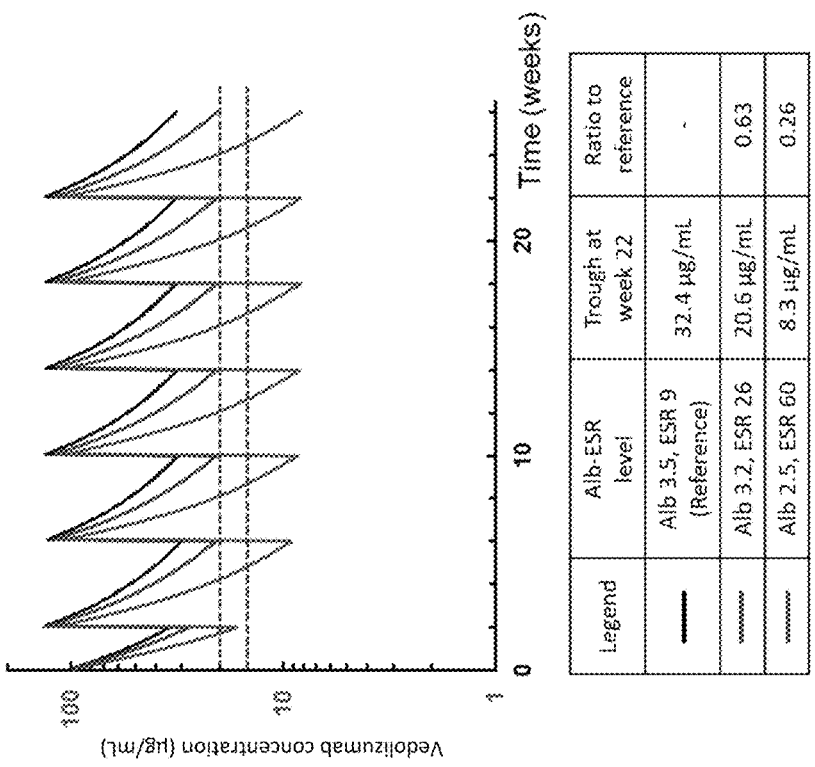
FIG. 3A and FIG. 3B.
Figure 3A:
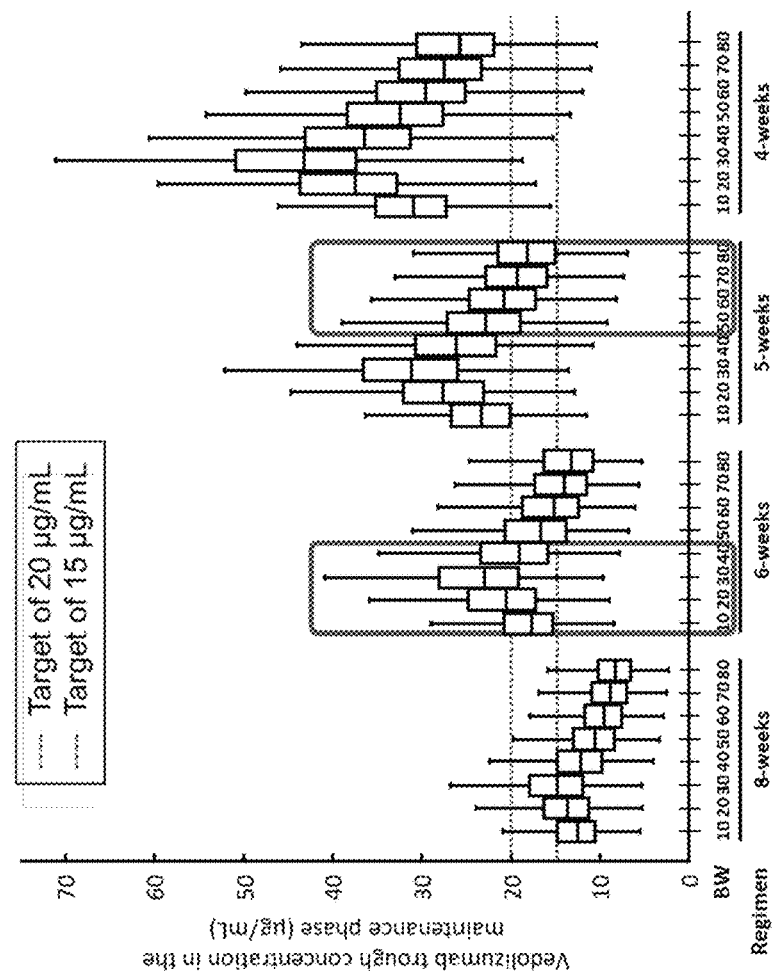

The second type of simulation analysis addressed the influence of the covariates (albumin and ESR) on the predicted cTrough. These simulations show that the cTrough significantly decreased with hypoalbuminemia <3.5 mg/dl. In addition, it was found that the combination of hypoalbuminemia and elevated ESR had the largest effect on cTrough with more extreme abnormalities resulting in a lower likelihood of achieving the target even with the every 4-week interval (FIG. 3B).

Exposure—Response Relationships

Clinical Outcomes of the Combined Cohort

The exposure-response relationships were examined by disease activity at infusion-3 and infusion-4 for cTrough, CL and AUC (FIG. 6A-6F [S2]). However, as appreciated in FIG. 6A-6F, the composite outcome that divides disease activity into four different categories does not appear to be sensitive enough to depict accurate exposure-response relationships. Next, to explore if composite infusion-4 remission could be predicted by specific PK cut points, an ROC analysis was conducted. ROC analysis was also unable to identify significant PK cut points for these composite cut points (data not shown). Furthermore, when disease activity was dichotomized between SFCR and no-SFCR at infusion-4 between all IBD patients, SFCR patients had a higher $AUC_{week\ 14}$ exposure than no-SFCR patients (Table 7). In addition, in a sensitivity analysis, when PK outcomes were examined by IBD diagnosis separately, there were no significant differences between specific CD disease locations. However, UC/IBD-U patients who were in SFCR at infusion-4 had higher $AUC_{week\ 14}$ and lower CL at infusion-4 than no-SFCR UC/IBD-U patients (Table 7).

TABLE 7

Pharmacokinetic outcomes stratified by steroid-free clinical remission at infusion-4.

| | No steroid-free clinical remission | Steroid-free clinical remission | P-value |
|---|---|---|---|
| All IBD -(retrospective and prospective cohorts) | | | |
| AUC infusion-4, μg*h/mL, (median, IQR) | 88811.0 (75507.0-116490.0) | 107075.0 (83897.5-131120.0) | 0.045 |
| Clearance infusion-4, L/day, (median, IQR) | 0.19 (0.13-0.23) | 0.17 (0.13-0.22) | 0.55 |
| Trough level infusion-4, μg/mL, (median, IQR) | 18.0 (10.4-23.0) | 22.0 (12.0-28.0) | 0.32 |
| Crohn's disease only | | | |
| AUC infusion-4, μg*h/mL, (median, IQR) | 97663.5 (73207.8-119242.5) | 97139.0 (82526.0-124340.0) | 0.57 |
| Clearance infusion-4, L/day, (median, IQR) | 0.17 (0.13-0.22) | 0.19 (0.13-0.24) | 0.58 |
| Trough level infusion-4, μg/mL, (median, IQR) | 17.0 (9.8-24.0) | 15.0 (10.0-23.0) | 1.00 |
| UC/IBD-U only | | | |
| AUC infusion-4, μg*h/mL, (median, IQR) | 84238.0 (76855.0-90052.0) | 120910.0 (96998.0-142040.0) | 0.01 |
| Clearance infusion-4, L/day, (median, IQR) | 0.22 (0.19-0.23) | 0.15 (0.12-0.17) | 0.04 |
| Trough level infusion-4, μg/mL, (median, IQR) | 18.0 (18.0-18.0) | 28.0 (23.0-33.0) | 0.11 |

Abbreviations: AUC, area under the concentration curve; UC, ulcerative colitis; IBD-U, IBD-unclassified.

As reported above, in a further subgroup analysis, it was found that there was a significant difference in week 14 vedolizumab concentrations between UC/IBD-U and CD patients (p=0.046). Given the low number of fecal calprotectin samples at the end of induction (n=10), no additional analysis was performed to identify PK targets associated with FCP (<250 µg/g) remission. Finally, there were no significant differences in PK outcomes (cTrough, CL or exposure) between patients who remained on vedolizumab monotherapy compared to patients receiving combination therapy (vedolizumab with an immunomodulator, data not shown).

Clinical Outcomes and Pre-Infusion Trough Levels of the Prospective Cohort

Figures 4A, 4B:
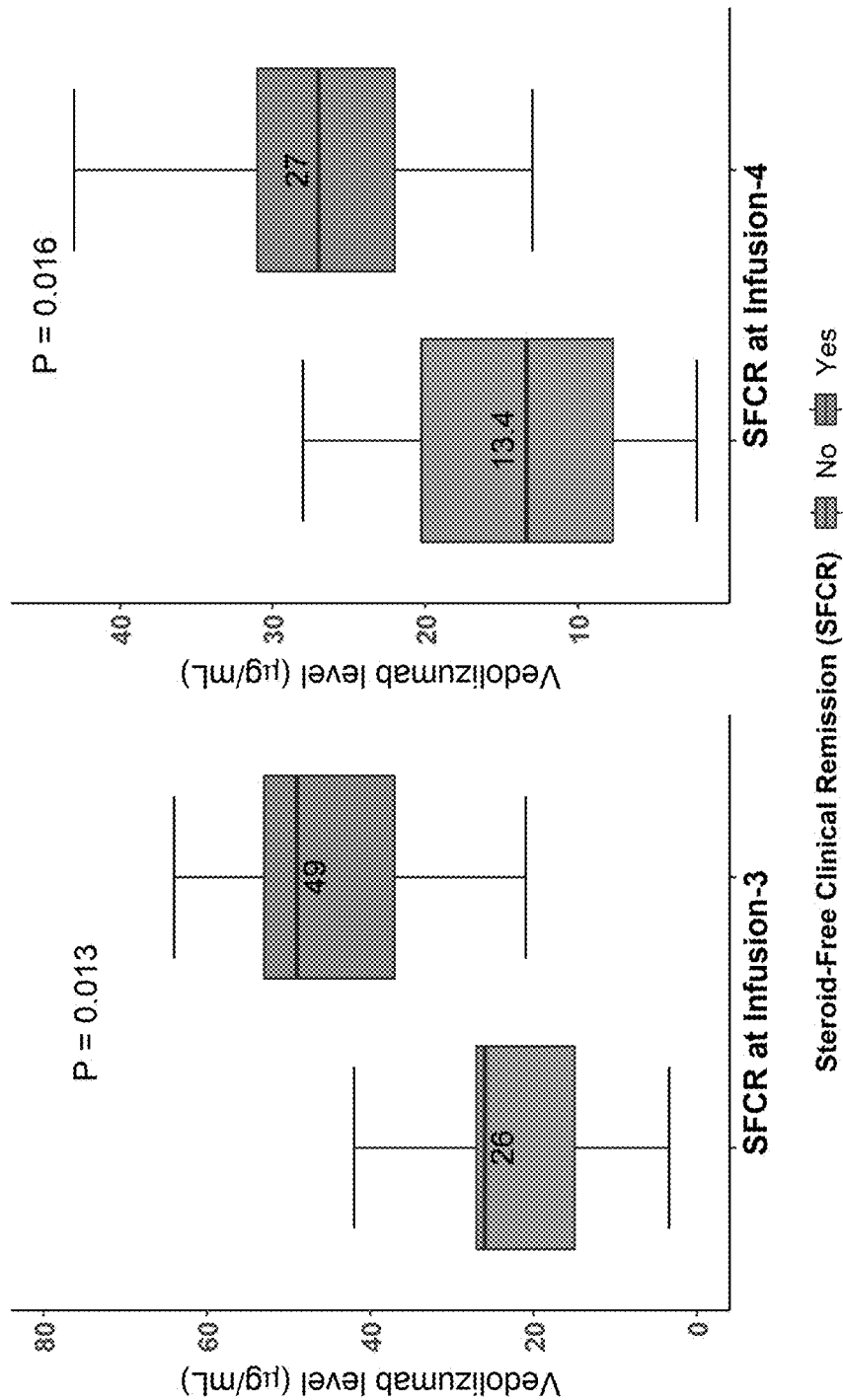
FIG. 4A-FIG. 4D. Exposure-response relationships-median cTrough at (FIG. 4A) infusion-3 and (FIG. 4B) infusion-4 between steroid-free clinical remission (SFRC) and active disease. Receiver-operating characteristic analysis of (FIG. 4C) infusion-3 and (FIG. 4D) infusion-4 associated with SFCR at infusion-4.

As there was more consistency in determining disease activity scores and time points in the prospective cohort, exposure-response analysis was performed using the data of the prospective patients (n=21). Among the prospective cohort, patients with SFCR at infusion-4 had higher median infusion-3 vedolizumab cTrough, median 49 µg/ml, compared to patients who did not achieve clinical remission with a median trough of 26 µg/ml (15-27; p=0.013; FIG. 4A). Similarly, patients with SFCR also maintained higher cTrough at infusion-4, median 27 µg/ml, compared to patients not in SFCR (median 13.4 µg/ml; 7.7-20.3; p=0.016; FIG. 4B).

Figures 4C, 4D:
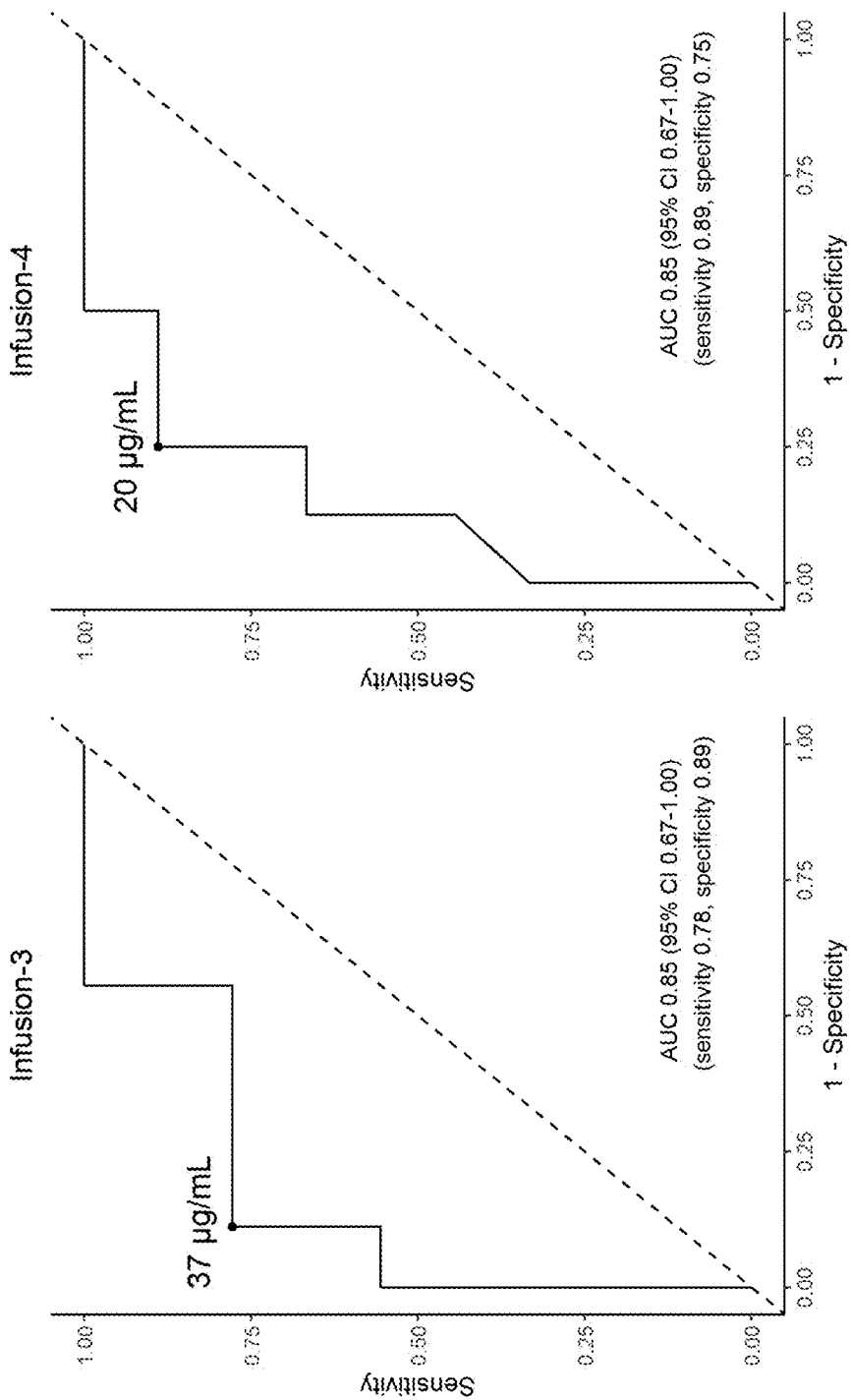

Consistent with the median trough levels, ROC analysis identified that an infusion-3 cTrough of at least 37 µg/ml best predicted SFCR at infusion-4 (AUC 0.85, 95% CI 0.67-1.00; sensitivity 0.78, specificity 0.89, positive predictive value [PPV] 0.88, negative predictive value [NPV] 0.80; FIG. 4C). In addition, an infusion-4 level of at least 20 µg/ml was associated with SFCR at infusion-4 (AUC 0.85, 95% CI 0.67-1.00; sensitivity 0.89, specificity 0.75, PPV 0.80, NPV 0.86; FIG. 4D).

Predictors of Poor Drug Exposure

Figure 5:
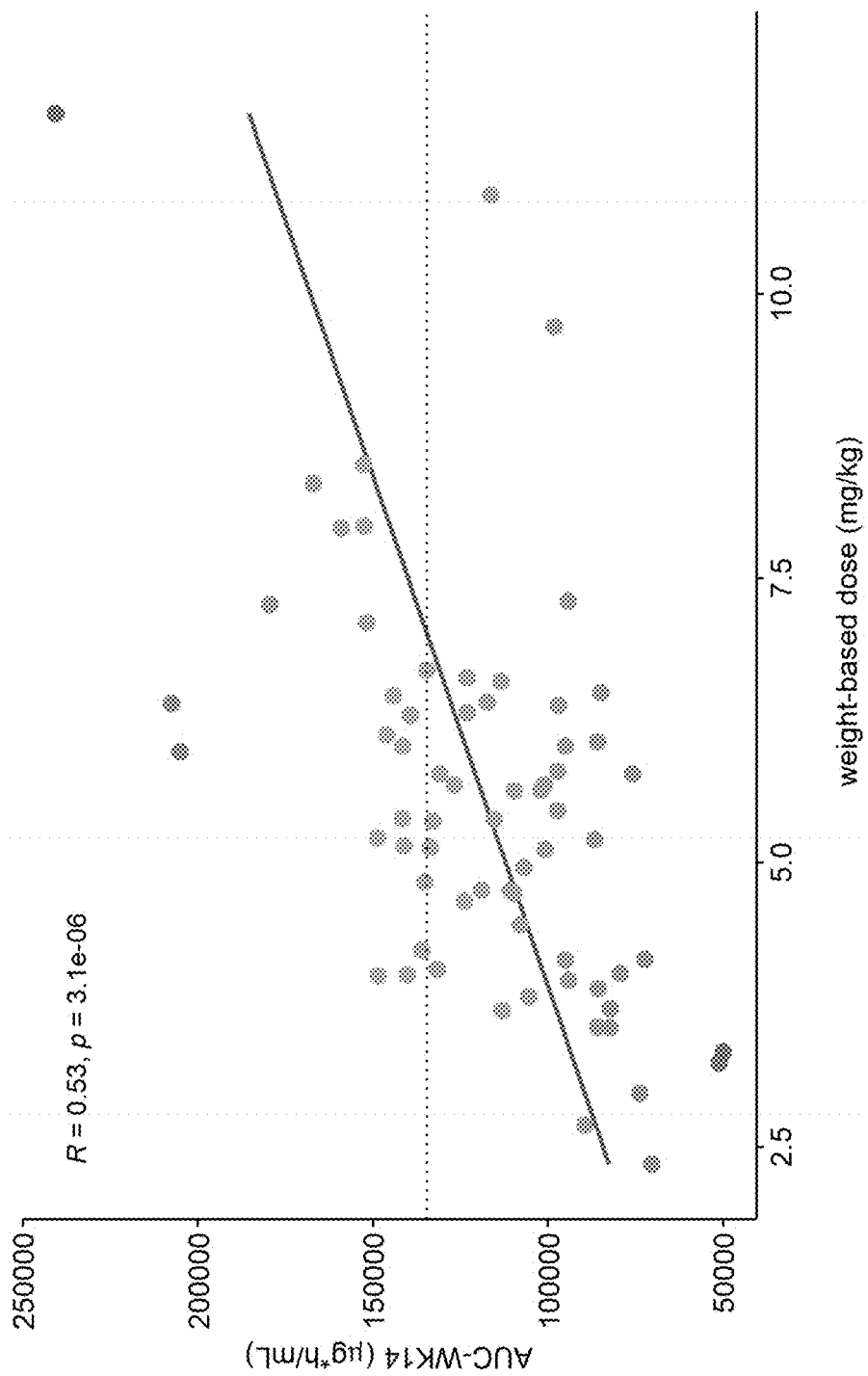
FIG. 5. Exposure response relationship of weight-based dosing (mg/kg) by induction exposure ($AUC_{week\ 14}$).

As cTrough is a static reflection of drug exposure since the last dose, cumulative drug exposure throughout induction (weeks 0-14; $AUC_{week-14}$) was also evaluated. ROC analysis revealed that clinical active disease (wPCDAI/PUCAI) was associated with an $AUC_{week\ 14}$ of less than 134,580 µg h/ml (AUC 0.78, 95% CI 0.55-1.00; sensitivity 0.78 specificity 0.78, PPV 0.78, NPV 0.78). To further identify the relationship between weight and dose on drug exposure in each individual, the scatterplot in FIG. 5 illustrates the relationship between weight-based dose (assuming standard induction intervals) and $AUC_{week14}$. Moreover, subsequent univariable regression identified that higher pretreatment body weight, elevated nCD64 and lower weight-based dosing predicted inadequate $AUC_{week\ 14}$ exposure. Multivariable modelling identified that after adjusting to weight-based dosing, elevated nCD64≥4.6 remained the only predictor of inadequate exposure (Table 3).

Exploratory Microbial PK Predictors

As previously noted, shotgun metagenomic analysis was performed on (n=13) baseline and (n=10) infusion-2 stool samples from a subset of 13 patients. Linear regression of microbial diversity within samples (alpha-diversity) found that a 1-standard deviation increase in the Shannon index at week 2 was associated with a 107% (95% CI, 103; 315%) increase in the infusion-3 cTrough (p=0.043). Moreover, a 1-standard deviation increase in Shannon index at week 2 was also associated with a 35% reduction (95% CI, −56.2; −4.2%) in infusion-4 CL (p=0.036) and a 25.6% (95% CI, 6.5; 48.1%) increase in $AUC_{week\ 14}$, following adjustment for dosing (p=0.016; data not shown). In contrast, the baseline Shannon index was not associated with any PK outcomes.

Figure 6C:
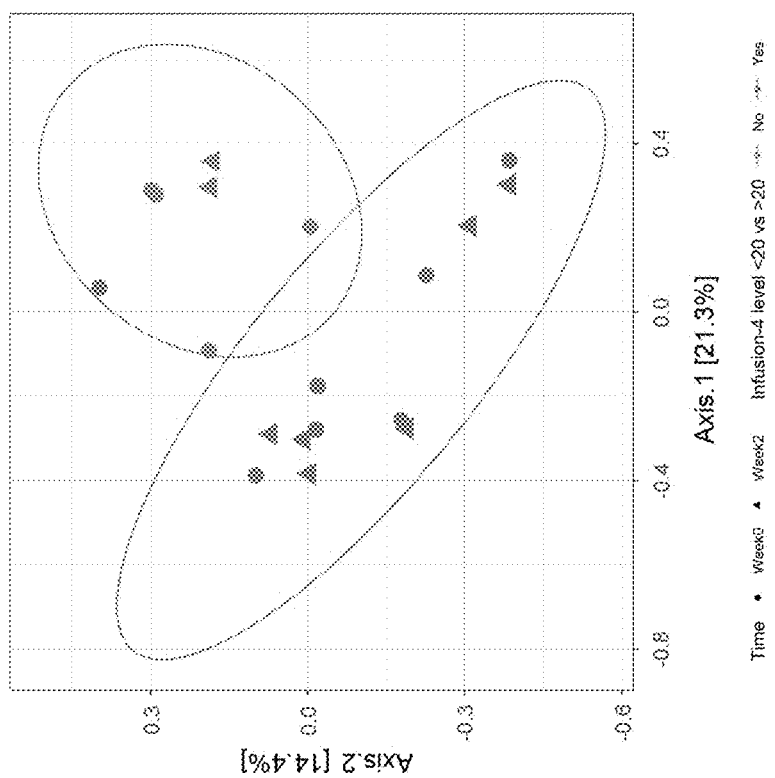

Concurrently, to identify the microbial diversity between samples, unsupervised principal coordinate analyses using Bray-Curtis distances, identified two distinct β-diversity clusters between patients with and without infusion-4 clinical remission (FIG. 6A), between inadequate and adequate exposure ($AUC_{week\ 14}$>134,580 µg h/ml; FIG. 6B) and between low and adequate infusion-4 cTrough >20 µg/ml; FIG. 6C. Similar differences in clusters were seen for PK outcomes at infusion-3 (data not shown).

Figures 7A, 7B:
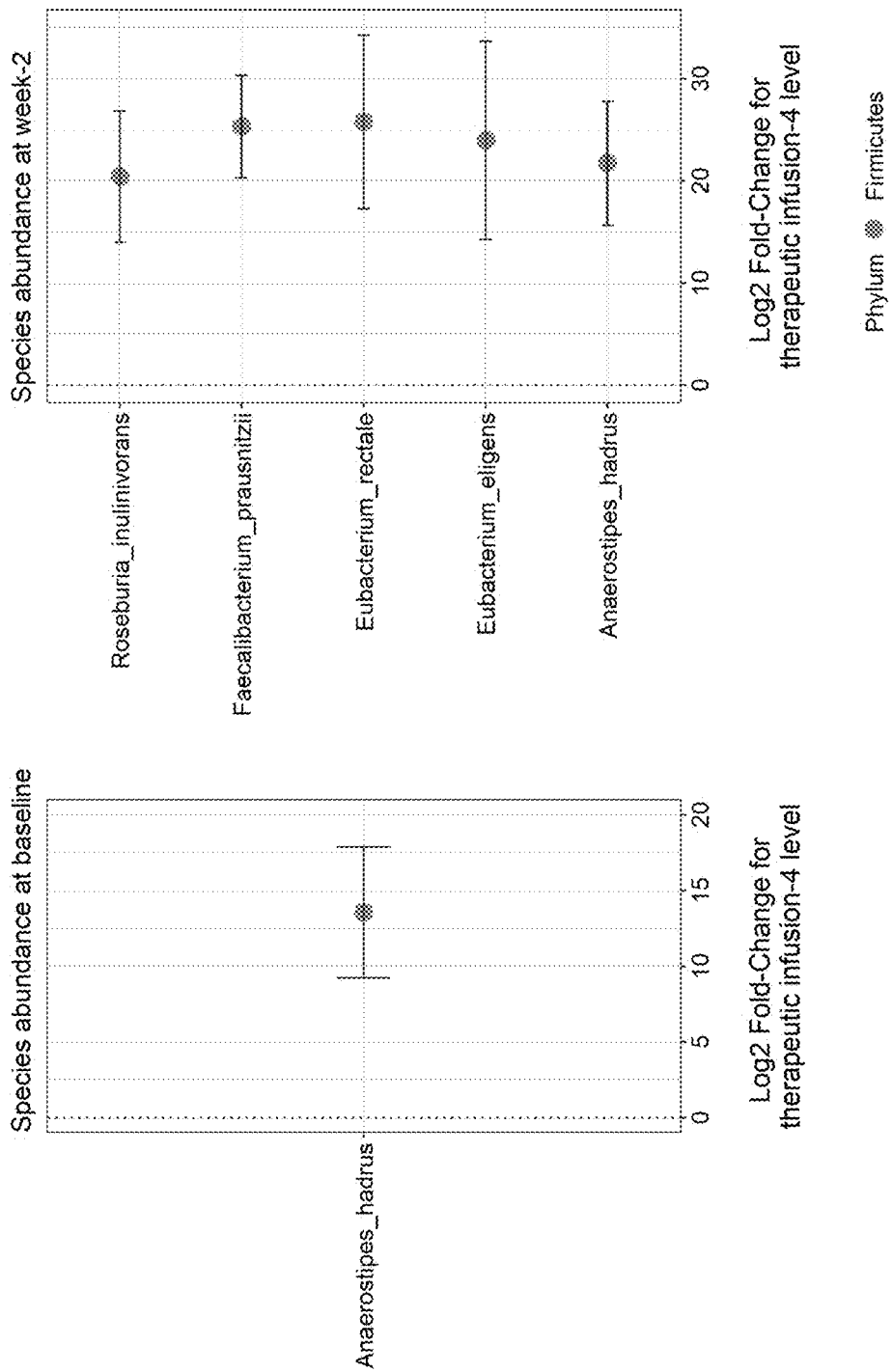
FIG. 7A-FIG. 7C. Increased log 2-fold changes for butyrate-producing species at (FIG. 7A) baseline, (FIG. 7B) week 2 and (FIG. 7C) functional pathways at week 2 (all false discovery rate <0.1).
Figure 7C:
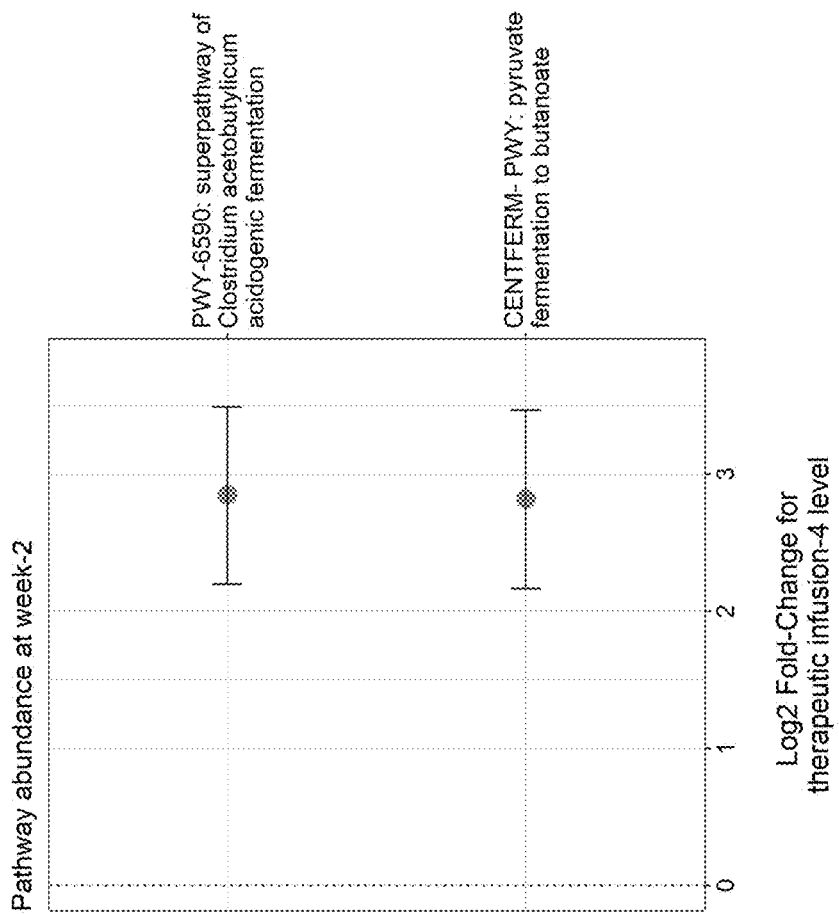

Moreover, to illustrate differences in the relative abundance of specific species and UniRef90 gene families aggregated to MetaCyc pathways, FIG. 7 shows differences on the log 2-fold change scale for a therapeutic (≥20 µg/ml) infusion-4 cTrough. An increase in the butyrate-producing *Anaerostipes hadrus* Firmicute at baseline was found to be associated with a therapeutic infusion-4 cTrough (FIG. 7A). There was an even stronger association of *A. hadrus* and four additional well-known butyrate-producing Firmicutes including *Faecalibacterium prausnitzii* at week 2 that predicted a therapeutic infusion-4 cTrough (FIG. 7B). Consistent with these results for microbial species, the functional pathway analysis found an increased abundance for two of the main pathways that lead to butyrate production with therapeutic infusion-4 cTrough (FIG. 7C). Thus, in one aspect, the presence or level of *A. hadrus* or other butyrate-producing Firmicutes may be used as a covariate in determining a patient-specific dosing regimen.

DISCUSSION

Through the combination of prospective and retrospective vedolizumab infusion data in a cohort of children and young adults, it was identified that higher weight for V1, and higher weight and an elevated ESR for CL were the PK covariates associated with an accelerated drug CL, while increases in albumin were associated with a decrease (improvement) in drug CL. Thus, in one aspect, the covariate of weight may be used to determine a dosing schedule, wherein an increased weight indicates that a higher dose or increased dosing frequency should be employed, and/or wherein an elevated weight and ESR for CL indicates that a higher dose or increased dosing frequency should be employed. These covariates have been incorporated into a vedolizumab population PK model that can be used to individualize vedolizumab dosing in this patient population. Using the new model in a simulation analysis of standard vedolizumab infusions (0, 2 and 6 weeks followed by every 8 weeks), it was demonstrated that the expected cTrough at week 22 (infusion-5) in the majority of patients would result in drug exposure below current cTrough targets. It was further found that interval shortening had a greater impact on achieving higher attainment of target rates compared to weight-based dose escalation. In addition, consistent with the anti-TNF PK literature, the severity of hypoalbuminemia resulted in higher drug CL (lower cTrough) than the inflammatory burden (elevated ESR). Infusion-3 cTrough of at least 37 µg/ml and infusion-4 cTrough of at least 20 µg/ml best predicted SFCR at infusion-4. In contrast, Applicant showed inadequate drug exposure during induction ($AUC_{week\ 14}$ of <134,580 µg h/ml) was associated with clinical non-response. Pre-treatment risks for poor drug exposure during induction were higher body weight (kg), an elevated nCD64 and lower weight-based dosing (mg/kg).

The first published pediatric vedolizumab PK study reported exposure outcomes derived from data collected in the Phase 2 HUBBLE study. Hyams et al. found that cTrough and exposure increased among most patients with higher doses. Vedolizumab dose selection, however, was based on simulations from an adult population PK model, and no formal pediatric PK modelling was reported. While formal vedolizumab PK models have been published, these studies were limited to relatively homogeneous adult cohorts, which were subjected to relative stringent inclusion criteria among phase I-IV clinical trials and one observational cohort. These prior PK models identified a limited number of PK covariates including albumin, extremely high body weight, ATV and anti-TNF exposure to be associated with higher CL. As real-world data included a younger patient population with the majority previously exposure to anti-TNF, with a relatively lower median age and broader weight range, a strong association between CL and V1 and weight was identified. In addition to serum albumin, ESR was newly identified as a third covariate for accelerated vedolizumab CL in the PK model which was associated with a 13.5% reduction in overall variability. Of note, another inflammatory biomarker, nCD64, that Applicant previously described being associated with accelerated anti-TNF CL did not significantly impact vedolizumab CL. In contrast, in a more in-depth analysis, nCD64 was found to be an independent predictor for poor drug exposure during induction. Thus, in one aspect, the disclosed systems and methods may use nCD64 as a covariate for predicting vedolizumab clearance and for determining a dosing regimen. It is likely that the sample size did not provide enough power to detect nCD64 as a covariate during the PK modelling phase as a relatively small number of nCD64 measurements were available. However, given the association seen between nCD64 and vedolizumab exposure as well as nCD64 and infliximab exposure, it appears that nCD64 (the Fcγ Receptor I for the IgG1 molecule) is not only a biomarker of drug CL but directly participating in CL of all IgG1 monoclonal antibodies (mAb). Interestingly, reducing mAb/Fcγ receptor binding affinity was shown to slow infliximab CL. In prior studies, it was hypothesized that infliximab non-response was related to the FcγRI/infliximab Fc fragment interaction inducing a pro-inflammatory cytokine storm, while this response was inhibited with selective blocking of FcγRI to prevent anti-TNF capture.

Another notable potential PK covariate, ATV, was not found to be significant in the PK analysis. This is likely attributed to the very low prevalence of ATV in IBD patients. One patient (1.4%) had ATV at infusion-2 and with no additional therapeutic intervention, the ATV was not detected in any subsequent infusions. This was similar to the immunogenicity rate among patients from the GEMINI trials receiving standard infusions (1.1-2.5%). While immunogenicity is a significant problem associated with accelerated CL in the treatment with other biological classes such as with anti-TNF therapy, consistent immunogenicities have not been shown to be common with vedolizumab. Moreover, a recent post hoc study of the GEMINI trials reanalyzed ATV detection with a drug-tolerant electrochemiluminescence assay and found a slightly higher ATV rate compared to their initial publications, though the impact on CL remained minimal in their updated population PK model.

The final vedolizumab PK model inclusive of weight, serum albumin and ESR provided a good fit for the pediatric patient cohort and described the data well while reducing the unexplained variability in PK parameters. Prior PK studies identified an unexplained variability in CL between 26.2 and 35%, while Applicant's final model had an unexplained variability in CL of 21.9%.

As noted, vedolizumab PK analysis in children has been limited to sparse clinical trial data sets or data from small cohorts. These studies found elevated inflammatory markers (including CRP and FCP) and longer intervals between infusions were associated with lower cTrough. Of note, CD patients had lower cTrough levels at week 2 (infusion-2) and week 6 (infusion-3) than UC/IBD-U patients, which was also seen in this current cohort study at infusion-4. In Phase II pediatric clinical trial, UC clinical responders had higher week 14 cTroughs than non-responders while no difference in cTrough was noted in the CD patients when stratified by the outcome.

The dosing simulations in the current study found that receiving standard dosing would lead to <20% of patients achieving a cTrough of 20 µg/ml at infusion-5. In addition, the simulations further illustrate the contributory effect of increased weight and hypoalbuminemia on subtherapeutic cTroughs. These simulations underscore that the labelled dosing is often inadequate and confirm the real-world observations that shorter intervals between infusions, as seen in this cohort and by others, are clinically warranted. For instance, if intervals were only shortened from every 8 weeks to every 6 weeks, there was an inverse correlation seen with 10 kg patients requiring an 11 mg/kg dose and 80 kg patients requiring a 6 mg/kg dose. However, this would not be practical in clinical practice as patients weighing 40 kg and higher would require more than one 300 mg vial per infusion visit to achieve a target attainment rate of ≥20 µg/ml. Thus, interval shortening for patients >40 kg to every 4-6-week intervals would be more practical. Given the frequent need for dose adjustment in both pediatric and adult-onset IBD, the disclosed PK model and simulation results further set the stage for implementing vedolizumab model-informed precision dosing (MIPD) to achieve consistent adequate drug exposure. In fact, more recent studies found that MIPD using a clinical decision support tool to guide anti-TNF dose optimizations has been shown to improve durability and reduce both immunogenicity and loss of response. A precision dosing dashboard for infliximab that instantaneously performs MIPD at the bedside has been developed (see Example below). Such dashboard may be used to implement the above-described MIPD for vedolizumab.

While no prospective study has identified an ideal infusion-3 or infusion-4 exposure target for the long-term response, the infusion-3 cTrough of ≥37 µg/ml and infusion-4 cTrough of ≥20 µg/ml for SFCR at infusion-4 are consistent with Vande Casteele et al., who found the early clinical response to be associated with an infusion-3 cTrough of 31 µg/ml. Moreover, Osterman et al. found an infusion-3 cTrough of 37.1 µg/ml was associated with early clinical response, while an infusion-4 cTrough of 18.4 µg/ml was also associated with clinical response at week 14.

In addition to exposure-response relationships with clinical outcomes, there has been an increased interest in next-generation sequencing to better characterize other treatment predictors among IBD patients. Ananthakrishnan et al. found that responders to vedolizumab had a higher abundance of butyrate-producing species and pathways at baseline and persisted up to 1 year of treatment. As butyrate is one of the key SCFAs that maintain the intestinal barrier, Applicant hypothesizes that improved SCFA homeostasis (reflected by in silico butyrate synthesis) is associated with a more intact mucosal barrier with in turn a more favorable PK with reduced mAb gut loss.

While the effect on the altered gut microbiome has previously been shown to alter serum concentrations of oral small molecule drugs (eg. digoxin), thus far the exact interplay of the microbiome with systemically administered biological therapies remains unknown. Importantly, similar observations of SCFA homeostasis reflecting a microbiome associated with long-term remission have been described for anti-TNF and azathioprine. Of note, studies that have investigated cancer pharmacomicrobiomics in mice have shown that the manipulation of the microbiome can affect response to anti-cancer therapies such as CTLA-4 and anti-PD-L1 mAbs. However, microbial signatures in vedolizumab patients may even be more pertinent than with other biological therapies as vedolizumab is thought to be gut-selective and microbial signatures may alter the intestinal gut barrier directly affecting CL. If specific microbial signatures are associated with adverse PK properties, such as accelerated drug CL and subsequent subtherapeutic drug levels, manipulation of the microbiome concomitantly (or even prior to switching biological) may be able to restore the intestinal gut barrier and improve the exposure to vedolizumab.

While this study is one of the first to conduct a comprehensive PK evaluation among pediatric and young adult IBD patients treated with vedolizumab, data were collected from real-world observational cohorts. As this study collected data from academic centers in the United States that commonly provide care to up to 22 years old, approximately 25% of the study cohort included young adult (18-21 years) patients. Therefore, it is unknown if the PK outcomes would be different in the study cohort including only children <18 years old. In contrast to one of the recently published adult PK models, Applicant did not identify that anti-TNF exposure influenced vedolizumab CL, which is likely related to the fact that 95% of the cohort and most pediatric-onset IBD patients starting vedolizumab have been previously exposed to anti-TNF therapies. Additionally, as 72% of the total subjects were recruited from the retrospective cohort, there could be a bias towards obtaining a cTrough in patients with active disease (reactive TDM). However, this bias may be limited as the institutional guideline endorses routine proactive monitoring of cTrough (starting at infusion-3 regardless of disease activity status).

Although immunogenicity is uncommon, the PK analysis relied on two different drug detection assays. As 72% were evaluated for ATVs using the same drug-tolerant assay, it is unlikely that assay type had a significant impact on the results. Disease activity outcomes were not uniformly collected and assessed in the retrospective cohort. While a strong exposure-response relationship between cTrough and clinical remission at infusion-4 was identified in this cohort, the literature on exposure-response relationships for vedolizumab is still under investigation. The prior pediatric vedolizumab study only identified an exposure-response relationship among UC patients, while some prior adult studies found that higher vedolizumab concentrations were associated with worse clinical outcomes. Thus, it is uncertain if overall trough levels are the most optimal reflection of exposure.

In conclusion, weight and two routinely collected biomarkers (albumin and ESR) were identified as strong predictors of vedolizumab CL in children and young adult IBD patients. The dosing simulations further underscore the limitations of using standard (as labelled) dosing regimens in children with moderate-to-severe disease. Finally, this study corroborated that early microbial fecal signatures related to butyrate production are associated with PK response.

Example 3. Disease Progression Pharmacokinetic Modeling Improves the Accuracy of Early Infliximab Concentration Targets Applicant hypothesized that model-informed precision dosing to predict early trough concentrations (cTrough) from baseline covariates alone would be imprecise. Therefore, the aims were to: one, test the precision of the model predicted (a priori) cTrough compared to the observed cTrough at dose3 and dose4 and two, test whether disease progression modeling would provide more precise predictions.

Methods: REFINE is a prospective cohort of 78 children and young adults receiving infliximab at four medical centers from 2014-2019. The DSH retrospective cohort includes 161 children and young adults with CD who started infliximab at a single center from 2019-2021. REFINE cTroughs were obtained at every infusion while the DSH cohort had cTroughs obtained either at dose3, dose4 or both. Model imprecision was calculated by the root mean square error (RMSE %) and percent bias by the mean prediction error (MPE %). The Pearson r and R2 were used to calculate the correlation between the observed and the model predicted cTrough.

Results: The median (IQR) age at the start of infliximab was 14.3 (11-16) years with 32% female, and 85% white race. The median starting dose was 7.1 (5.5-10) mg/kg. Using the combined cohorts, the observed percent improvement of all four covariates from dose1-dose3 and from dose1-dose4 (Table1) was first calculated. The a priori predicted cTrough at dose3 and dose4 was assessed for both cohorts using the Xiong et al. popPK model and Bayesian estimation under three conditions. Condition1: cTrough were predicted using only the four baseline (pre-treatment) covariates of clearance. Condition2: cTrough were calculated using a combination of the baseline covariates and the calculated improvement (from baseline as shown in Table 1) in all four covariates at either dose 3 or dose 4. Condition 3: combination of Condition 2 and one observed cTrough (week 2 for dose 3 and week 6 for dose 4 predictions). As shown, the MPE % improved when the simulated dose 3 covariates were included in the prediction (Tables 8 and 9). Furthermore, the correlations between the predicted and observed dose 3 cTrough also improved for Condition A 3. For dose 4, incorporating the week 6 level improved the RMSE % and Pearson correlation (Condition B3).

TABLE 8

Observed improvement in the four covariates of drug clearance from dose1-dose3 or dose1-dose4.

| Outcome | Δ weight | Δ albumin | Δ ESR | Δ nCD64 |
|---|---|---|---|---|
| Dose3 (all subjects) | 6% | 16% | −41% | −25% |
| Dose3 ≥18 µg/mL | 9% | 17% | −21% | −17% |
| Dose4 (all subjects) | 8% | 16% | −25% | −15% |
| Dose4 ≥5 µg/mL | 10% | 15% | −33% | −26% |
| Dose4 clinical remission | 10% | 17% | −25% | −36% |

TABLE 8-continued

Observed improvement in the four covariates of drug clearance from dose1-dose3 or dose1-dose4.

| Outcome | Δ weight | Δ albumin | Δ ESR | Δ nCD64 |
|---|---|---|---|---|
| Mean | 8.6% | 16% | −29% | −24% |
| (standard deviation) | (1.7) | (0.84) | (8) | (8.4) |

ESR, erythrocyte sedimentation rate; nCD64, neutrophil CD64 expression; clinical remission based on a weight pediatric Crohn's disease index < 12.5 and off steroids at dose4. For clinical remission, only the REFINE cohort was used.

TABLE 9

Model performance without and with disease progression pharmacokinetic modeling.

| Conditions | MPE | RMSE | Pearson r | $R^2$ |
|---|---|---|---|---|
| (A1) Dose3 trough (baseline cov. only) | 17.9% | 73% | 0.36 | 0.14 |
| (A2) Dose3 trough (baseline cov. + calculated dose3 cov.) | 2.8% | 80% | 0.39 | 0.15 |
| (A3) Dose3 trough (baseline cov. + dose2 trough + calculated dose3 cov.) | −50% | 118% | 0.79 | 0.63 |
| (B1) Dose4 trough (baseline cov. only) | −63.4% | 323% | 0.4 | 0.16 |
| (B2) Dose4 trough (baseline cov. + calculated dose4 cov.) | 95.5% | 398% | 0.43 | 0.19 |
| (B3) Dose4 trough (baseline cov. + dose3 trough + calculated dose4 cov.) | −76% | 202% | 0.67 | 0.45 |

MPE %, mean prediction error; RMSE, root mean square error; cov., covariate.

Conclusions: Disease progression modeling improves the precision of predicting the targeted dose3 (week6) cTrough and can be incorporated in precision dosing, via the PK dashboard for example, to perform more accurate model-informed precision dosing.

Example 4. Model-Informed Precision Dosing for Biologics is Now Available at the Bedside for Patients with Inflammatory Bowel Disease-Technical Dashboard Development An infliximab "demonstrator" dashboard was created as both a basic proof of concept PK dashboard and a template for the MIPD platform. The features of the dashboard may be applied to the vedolizumab dosing regimen models as described above.

To refine the demonstrator for use by clinicians and operate within the EHR, a design sprint was conducted over 4 distinct phases with structured interviews to identify the requirements of users (physicians and advanced practitioners) and create design wireframes (prototypes) for the infliximab dashboard. Phase 1 included interviews with clinical staff (nurses, physicians, and clinical pharmacologists) to review the existing workflow and processes for infliximab dose selection at the start of and during therapy to identify potential weaknesses with using the current EHR system to dose optimize infliximab. In phase 2, the team analyzed participant's responses, identified decision support needs, and created low-fidelity dashboard design wireframes for initial physician review. By the end of phase 3, the redesigned dashboard was again presented to physicians for feedback, and additional modifications (page layout, responder "must-haves," and dashboard advanced features) were made based on consensus. During design phase 4, physicians were presented with restructured wireframes with higher fidelity and an interactive (clickable) prototype using the InVision (InVisionApp Inc.) platform, which allows users to trial and edit the design interface prior to final production.

From a technical aspect, the dashboard coding for the backend (server-side) is written in C#.NET and is primarily constructed with an application programming interface (API) that allows the PK dashboard (frontend display) to launch within the local EHR (Epic). For the dashboard to run smoothly, patient data (medication administration history and laboratory results) was extracted in real time with the use of Fast Healthcare Interoperability Resources (FHIR) technology.

The final PK dashboard is equipped with 2 primary displays, the induction display ("New Start Wizard") that opens from infusions 1-3 and the maintenance display that opens starting at infusion 4 and all subsequent infusions.

Results

Eleven health care professionals (physicians, nurses, and clinical pharmacologists) participated in the design sprints over 26 sessions. The SUS was completed after 3 distinct time points by 10 separate physicians with varied clinical experience (mean 18 years, standard deviation [SDI 14]) and number of IBD patients seen per month (mean 25 patients, SD 23).

Figure 8:
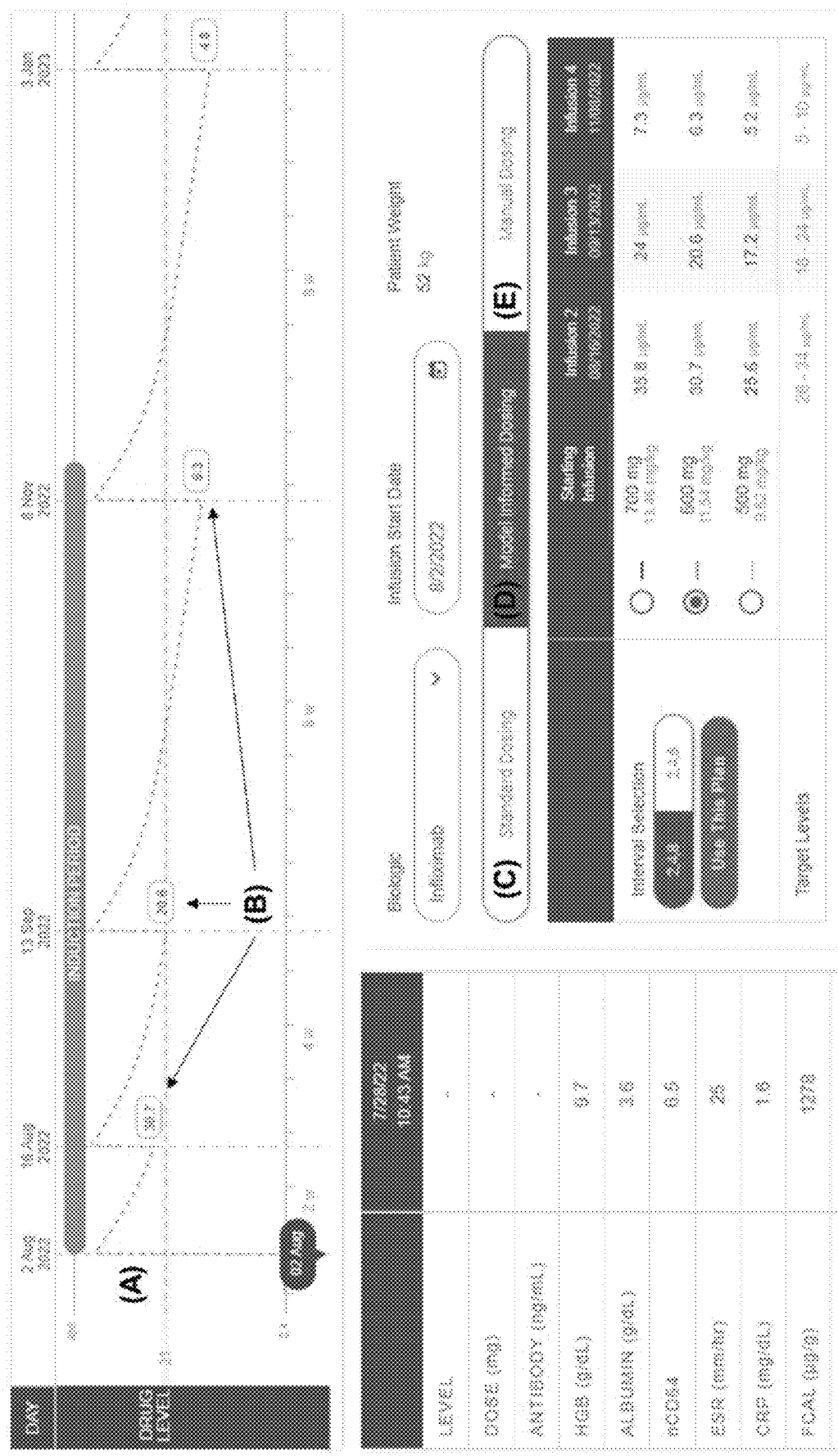
FIG. 8. The RoadMAB New Start Wizard was created to simplify induction dose selection. Prior to receiving the first dose, the New Start Wizard creates a projected (A) concentration-time curve along with (B) future (projected) trough concentrations (at dose 2, dose 3, and dose 4) based on the selected interval and dose. The user can toggle through (C) standard dosing, (D) model-informed dosing, and (E) manual dosing to guide the dosing decision.

During phase 1, the mean (SD) SUS for the current process (using Epic without a PK dashboard) for infliximab dose optimizations was 63.1 of 100 (SD 14.8, n=4 physicians). Following user feedback, stepwise modifications were made to the wireframes (up to phase 4) for RoadMAB. The mean SUS for RoadMAB EHR, version 1 was 76 of 100 (SD 14.3, n=4 physicians). Following a series of additional redesign sessions, the mean SUS for RoadMAB EHR, version 5 was 86.5 of 100 (SD 15.2, n=5 physicians).
RoadMAB Features The New Start Wizard (FIG. 8) was created within RoadMAB to simplify MIPD for infliximab induction by quickly incorporating baseline laboratory results (covariates of drug clearance), conducting Bayesian PK estimation using the selected population PK model, and displaying multiple projected concentration-time profiles. During maintenance therapy, RoadMAB also rapidly incorporates past drug administrations and laboratory results (including therapeutic drug monitoring ("TDM")) to display multiple projected concentration-time profiles and the corresponding (predicted) trough concentrations for 2 subsequent infusions. Advanced dashboard features include user modification of the default targeted trough concentration range during induction and maintenance, selection of up to five different population PK models, and electing the specific TDM assay. The same user interface has been optimized for vedolizumab, as well (not shown).

TDM Consultations

Prior to the integration of RoadMAB within the EHR, individualized MIPD was available to clinicians as a formal PK consult conducted by the clinical pharmacology pharmacometrics service. During these consults, the clinical pharmacologists provided dose recommendations following TDM using the RoadMAB demonstrator along with Bayesian dosing software MwPharm++(Medimatics, Maastricht, the Netherlands). Following institutional review board approval, a retrospective review of all infliximab PK consults requested by the primary gastroenterologist was performed. In total, 21 IBD patients who had a PK consult during induction (n=2) and maintenance (n=19) were identified. The median age was 15 years (interquartile range, 11-18) and 76.2% (16 of 21) had Crohn's disease (Table 10).

TABLE 10

Patient characteristics at the time of the pharmacokinetic consult

| Characteristic | n = 21 |
| --- | --- |
| Age, years; median (IQR) | 15 (11-18) |
| IBD diagnosis, Crohn's disease; n | 16 (76%) |
| Therapy phase; n in maintenance | 19 (90.4%) |
| Weight-based dose, mg/kg; median (IQR) | 9.7 (7.9-11.2) |
| Interval, weeks; median (IQR) | 4 (4-6) |
| Maintenance trough, µg/mL; median (IQR) | 11 (5.1-23.5) |
| No. with antibodies to infliximab (ATI); n | 6 (28.6%) |
| ATI concentration, ng/mL; median (IQR) | 187 (102-270) |
| Albumin, g/dL; median (IQR) | 3.9 (3.6-4.1) |
| Paris classification; n | |
| Crohn's location: L1, L2, L3 | 6 (37.5%), 4 (25%), 6 (37.5%) |
| Crohn's behavior: B1, B2, B3 | 12 (75%), 1 (6.3%), 3 (18.7%) |
| Ulcerative colitis location, E4 | 5 (100%) |

Pharmacokinetic consults varied from requests for an increase (n=10) or decrease (n=8) in maintenance trough concentrations, requests to forecast an induction regimen (n=2), and a request to forecast trough concentrations after a bowel resection (n=1). Most (12 of 21) MIPD recommendations resulted in (agreed upon) changes in both dose (mg) and interval (weeks) by the treating physician. Partial agreement (dose only or interval only) occurred in 7 of 21 of the consults, with only 2 PK recommendations (both for induction doses) not instituted by the physician. Among the 19 consults during the maintenance phase, a post-consult trough concentration was available within 6 months after the initial consult for all 19 patients. Eighty-four percent (n=16) of post-consult concentrations were within or above the requested range, and 58% (n=11) were within the requested narrow concentration range (±2.5 ug/mL). Among the 3 patients with concentrations below the targeted level, one patient exhibited abnormally high drug clearance despite 16 mg/kg every 4 weeks and ultimately required an ileocecal resection, whereas the second patient had incomplete data (received external infusions) to confirm adherence to the PK recommendations. The third patient required infliximab discontinuation with elevated antibodies to infliximab (ATI) and an undetectable drug concentration secondary to non-adherence. When the full recommendation was instituted by the physician, 92% (11 of 12) of the post-consult concentrations were within or above the requested range, and 75% (9 of 12) were within the requested narrow concentration range (±2.5 ug/mL). Lastly, 5 other patients had ATI at the time of the PK consult. Following the consult, repeat TDM showed 2 had an undetectable ATI, and the other 3 had low level ATI (<250 ng/mL) in the setting of therapeutic concentrations.

Use of the PK Dashboard

The following PK consult demonstrates the utility of the PK dashboard for a typical patient with rapid drug clearance at the first maintenance dose. While the PK dashboard is illustrated for Infliximab, the general features of the disclosed dashboard may be used with the vedolizumab systems and methods as disclosed herein.

Figure 9A:
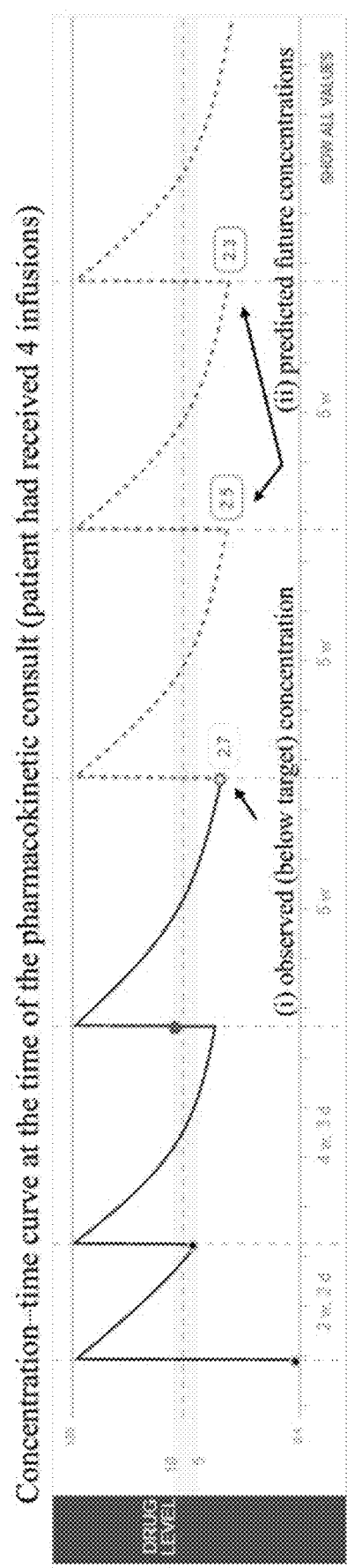
FIG. 9A-9B. Real-world use of the maintenance PK dashboard highlighting the utility of model-informed precision dosing for patients found to have rapid drug clearance. The patient's (FIG. 9A) observed (solid line) concentration-time curve, observed concentration (2.7 μg/mL) and the predicted (dashed-line) future concentrations at the time of the consult.
Figure 9B:
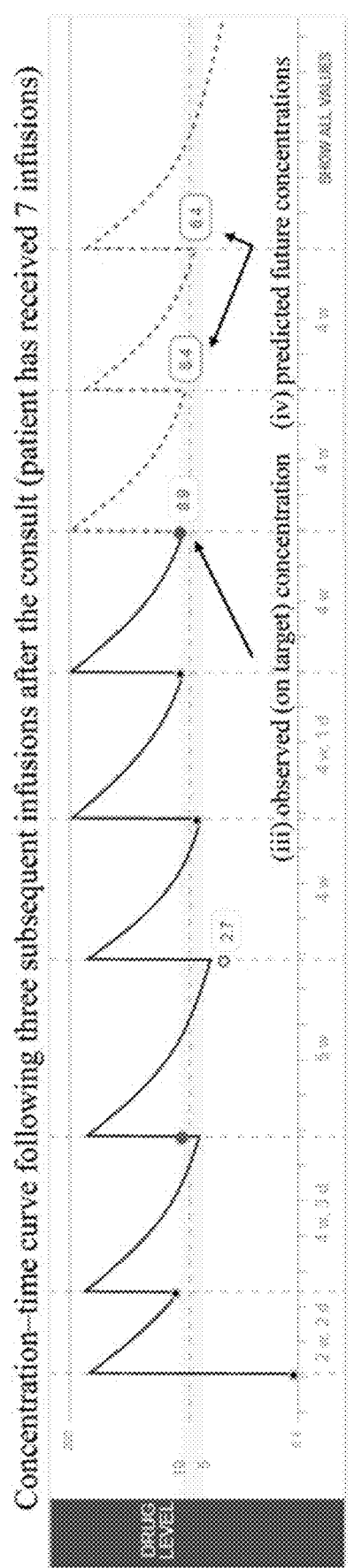

Infliximab (10 mg/kg) was started during induction in a 7-year-old child with severe Crohn's disease. Proactive TDM was performed at the fourth infusion (week 12) and revealed an infliximab trough of 2.7 ug/mL (FIG. 9A), and ATI was undetectable (using a drug-tolerant assay). As the trough concentration was below the center's target (5-10 ug/mL) and subsequent infusions at this dose and frequency (FIG. 9A) were predicted to be below the trough target, a PK consult was performed using a published PK model, the patient's past infliximab administration history, and the available covariates of drug clearance (weight, drug concentration, and albumin). The final recommendation was to increase the dose to 15 mg/kg and escalate the frequency to every 4 weeks. Proactive TDM was repeated prior to the third intensified dose, and the patient's trough concentration (8.9 ug/mL, FIG. 9 B) was within the targeted range, with future trough concentrations predicted to remain within the targeted range (FIG. 9B).

DISCUSSION

With the current technology to perform MIPD at the bedside and the availability of extensive population PK data for infliximab, suboptimal exposure in pediatric IBD should become a rare event. However, low trough concentrations and high rates of immunogenicity are common when standard dosing regimens are used for all patients. The RoadMAB dashboard was developed to improve drug durability, as anti-TNF biologics (infliximab and adalimumab) are the only biologics approved by the United States Food and Drug Administration for children and remain first-line therapy to manage pediatric Crohn's disease in North America.

The dashboard design process led to notable improvements in the SUS from empiric dosing (without a dashboard) to the final design (86.5 of 100) of RoadMAB; as a sidenote, any SUS score >70 is considered above average. Additionally, real-world use of the infliximab dashboard during PK consults demonstrated good precision to achieve individual concentration targets and reduce ATI concentrations for patients receiving maintenance infusions.

All percentages and ratios are calculated by weight unless otherwise indicated.

All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "20 mm" is intended to mean "about 20 mm."

Every document cited herein, including any cross referenced or related patent or application, is hereby incorporated herein by reference in its entirety unless expressly excluded or otherwise limited. All accessioned information (e.g., as identified by PUBMED, PUBCHEM, NCBI, UNIPROT, or EBI accession numbers) and publications in their entireties are incorporated into this disclosure by reference in order to more fully describe the state of the art as known to those skilled therein as of the date of this disclosure. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications may be made without departing from the spirit and scope of the invention. It is therefore intended to cover in the appended claims all such changes and modifications that are within the scope of this invention.

What is claimed is:

1. A method for preparing a patient-specific vedolizumab dosing regimen for an individual diagnosed with an inflammatory bowel disease in need thereof, comprising
   a. accessing, using a processor, a memory;
   b. selecting a first model stored in the memory wherein the model comprises determining systemic clearance (CL) of vedolizumab based on the following: $CL=CL_{pop} \times (WT/70)^{0.606} \times (ALB/3.5)^{-1.44} \times (ESR/9)^{0.112}$, wherein $CL_{pop}$ is the typical population CL for a patient, WT represents body weight, ALB represents albumin level, and ESR represents erythrocyte sedimentation rate;
   c. forecasting, based on the selected first model, a patient-specific predicted concentration-time profile of the vedolizumab,
   d. selecting a dosing regimen, based on the forecasting, wherein the dosing regimen achieves a treatment objective, said treatment objective being a therapeutic level of vedolizumab in the patient;
   e. outputting the dosing regimen; and
   f. administering the vedolizumab to the individual based on the dosing regimen.

2. The method of claim 1, further comprising receiving data indicative of a baseline laboratory result for the patient.

3. The method of claim 1, further comprising receiving data indicative of a response of the individual to an administered dose of vedolizumab.

4. The method of claim 1, further comprising receiving data from the individual, the data comprising a covariate selected from an albumin level, a hemoglobin level, a platelet level, a C-reactive protein (CRP) level, a neutrophil CD64 (nCD64) level, a fecal calprotectin level, a BSA level, a weight, and an antibody specific to vedolizumab.

5. The method of claim 1, further comprising receiving data from the individual, the data comprising a covariate selected from a body weight (WT), an albumin level (ALB), an erythrocyte sedimentation rate (ESR), an nCD64 level, and combinations thereof.

6. The method of claim 1, further comprising receiving data from the individual, the data comprising one or both of an ESR level and an nCD64 level.

7. The method of claim 1, further comprising outputting a projected concentration-time profile based on the received data.

8. The method of claim 1, further comprising outputting a predicted trough concentration.

9. The method of claim 1, further comprising receiving data reflecting a response of the individual to the patient-specific dosing regimen.

10. The method of claim 1, further comprising updating the first model based on the data.

11. The method of claim 10, further comprising calculating, based on the updated first model, at least one dosing regimen.

12. The method of claim 11, further comprising outputting the updated dosing regimen.

13. The method of claim 12, further comprising administering the updated dosing regimen.

14. The method of claim 1, wherein the method is carried out during an induction phase.

15. The method of claim 1, wherein the method is carried out during a maintenance phase.

16. The method of claim 1, the individual being a pediatric individual diagnosed, or identified as likely to be diagnosed with an inflammatory bowel disease.

17. The method of claim 1, the individual being an adult individual diagnosed, or identified as likely to be diagnosed with an inflammatory bowel disease.

18. The method of claim 16, where the inflammatory bowel disease is Crohn's disease (CD), ulcerative colitis (UC) or IBD unclassified (IBD-U).

19. A system for preparing a patient-specific vedolizumab dosing regimen for an individual diagnosed with an inflammatory bowel disease in need thereof, comprising computer-readable, processor-executable instruction for carrying out a method comprising
   a. accessing, using a processor, a memory;
   b. selecting a first model stored in the memory wherein the model comprises determining systemic clearance (CL) of vedolizumab based on the following: $CL=CL_{pop} \times (WT/70)^{0.606} \times (ALB/3.5)^{-1.44} \times (ESR/9)^{0.112}$, wherein $CL_{pop}$ is the typical population CL for a patient, WT represents body weight, ALB represents albumin level, and ESR represents erythrocyte sedimentation rate;
   c. forecasting, based on the selected first model, a patient-specific predicted concentration-time profile of the vedolizumab,
   d. selecting a dosing regimen, based on the forecasting, wherein the dosing regimen achieves a therapeutic level of vedolizumab in the patient; and
   e. outputting the dosing regimen for administering the vedolizumab to the individual.

20. The system of claim 19, where the inflammatory bowel disease is Crohn's disease (CD), ulcerative colitis (UC) or IBD unclassified (IBD-U).

\* \* \* \* \*